United States Patent
Soborski

(10) Patent No.: US 10,482,303 B2
(45) Date of Patent: Nov. 19, 2019

(54) METHODS AND A SYSTEM FOR VERIFYING THE AUTHENTICITY OF A MARK

(71) Applicant: SYS-TECH SOLUTIONS, INC., Princeton, NJ (US)

(72) Inventor: Michael L. Soborski, Allentown, NJ (US)

(73) Assignee: SYS-TECH SOLUTIONS, INC., Princeton, NJ (US)

( * ) Notice: Subject to any disclaimer, the term of this patent is extended or adjusted under 35 U.S.C. 154(b) by 0 days.

(21) Appl. No.: 16/026,612

(22) Filed: Jul. 3, 2018

(65) Prior Publication Data

US 2018/0314869 A1 Nov. 1, 2018

Related U.S. Application Data

(63) Continuation of application No. 14/845,099, filed on Sep. 3, 2015, now abandoned, which is a
(Continued)

(51) Int. Cl.
*G06K 7/14* (2006.01)
*G06K 19/06* (2006.01)
(Continued)

(52) U.S. Cl.
CPC ....... *G06K 7/1473* (2013.01); *G06K 9/00577* (2013.01); *G06K 19/06056* (2013.01);
(Continued)

(58) Field of Classification Search
CPC ....... G06K 19/06028; G06K 19/06037; G06K 9/00577; G06K 2009/0059; G07D 7/0043;
(Continued)

(56) References Cited

U.S. PATENT DOCUMENTS 5,153,418 A 10/1992 Batterman et al.
5,325,167 A 6/1994 Melen
(Continued)

FOREIGN PATENT DOCUMENTS

CN 103279731 A 9/2013
GB 2221870 A 2/1990
(Continued)

OTHER PUBLICATIONS

Notice of Acceptance issued in related application AU 2017234124, dated Nov. 13, 2018, 3 pages.
(Continued)

*Primary Examiner* — Suezu Ellis
(74) *Attorney, Agent, or Firm* — Drinker Biddle & Reath LLP

(57) ABSTRACT

In one implementation, a processor: (1) receives an image of a candidate mark from an image acquisition device, (2) uses the image to measure one or more characteristics at a plurality of locations on the candidate mark, resulting in a first set of metrics, (3) removes, from the first set of metrics, a metric having a dominant amplitude, resulting in a trimmed first set of metrics, (4) retrieves, from a computer-readable memory, a second set of metrics that represents one or more characteristics measured at a plurality of locations on an original mark, (5) removes, from the second set of metrics, a metric corresponding to the metric removed from the first set of metrics, resulting in a trimmed second set of metrics, (6) compares the trimmed first set of metrics with the trimmed second set of metrics, and (7) determines whether the candidate mark is genuine based on the comparison.

15 Claims, 23 Drawing Sheets

Related U.S. Application Data continuation-in-part of application No. 14/561,215, filed on Dec. 4, 2014, now abandoned, which is a continuation of application No. 13/782,233, filed on Mar. 1, 2013, now Pat. No. 8,950,662.

(60) Provisional application No. 62/053,905, filed on Sep. 23, 2014, provisional application No. 61/717,711, filed on Oct. 24, 2012, provisional application No. 61/676,113, filed on Jul. 26, 2012, provisional application No. 61/605,369, filed on Mar. 1, 2012.

(51) Int. Cl.

| | |
|---|---|
| *G06K 19/08* | (2006.01) |
| *G06K 9/00* | (2006.01) |
| *G07D 7/20* | (2016.01) |
| *G07D 7/202* | (2016.01) |
| *G07D 7/005* | (2016.01) |
| *G06Q 30/00* | (2012.01) |

(52) U.S. Cl.
CPC ...... *G06K 19/086* (2013.01); *G06Q 30/0185* (2013.01); *G07D 7/0054* (2017.05); *G07D 7/202* (2017.05); *G07D 7/2016* (2013.01); *G06K 2009/0059* (2013.01)

(58) Field of Classification Search
CPC .... G07D 7/0051; G07D 7/0054; G07D 7/202; G07D 7/2016; G07D 7/2025; B42D 25/30; B42D 25/305; B42D 25/318; B42D 25/405
See application file for complete search history.

(56) References Cited

U.S. PATENT DOCUMENTS

| | | |
|---|---|---|
| 5,351,834 A | 10/1994 | Duss |
| 5,465,303 A | 11/1995 | Levison et al. |
| 5,521,984 A | 5/1996 | Denenberg et al. |
| 5,563,401 A | 10/1996 | Lemelson |
| 5,583,950 A | 12/1996 | Prokoski |
| 5,673,338 A | 9/1997 | Denenberg et al. |
| 5,706,091 A | 1/1998 | Shiraishi |
| 5,883,971 A | 3/1999 | Bolle et al. |
| 5,903,356 A | 5/1999 | Shiraishi |
| 5,946,103 A | 8/1999 | Curry |
| 5,978,495 A | 11/1999 | Thomopoulos et al. |
| 6,032,861 A | 3/2000 | Lemelson et al. |
| 6,185,318 B1 | 2/2001 | Jain et al. |
| 6,398,117 B1 | 6/2002 | Oakeson et al. |
| 6,421,123 B1 | 7/2002 | Shiraishi |
| 6,460,766 B1 | 10/2002 | Olschafskie et al. |
| 6,543,691 B1 | 4/2003 | Lemelson et al. |
| 6,612,494 B1 | 9/2003 | Outwater |
| 6,760,472 B1 | 7/2004 | Takeda et al. |
| 6,922,480 B2 | 7/2005 | Rhoads |
| 6,970,236 B1 | 11/2005 | Markantes et al. |
| 7,025,269 B2 | 4/2006 | Marshall |
| 7,044,376 B2 | 5/2006 | Nelson et al. |
| 7,080,041 B2 | 7/2006 | Nagel |
| 7,229,025 B2 | 6/2007 | Sussmeier et al. |
| 7,264,174 B2 | 9/2007 | Chang et al. |
| 7,277,891 B2 | 10/2007 | Howard et al. |
| 7,474,773 B2 | 1/2009 | Chau |
| 7,526,110 B2 | 4/2009 | Niinuma et al. |
| 7,533,062 B2 | 5/2009 | Sanchez et al. |
| 7,576,842 B2 | 8/2009 | Park |
| 7,577,844 B2 | 8/2009 | Kirovski |
| 7,616,797 B2 | 11/2009 | Bailey et al. |
| 7,673,807 B2 | 3/2010 | Simske et al. |
| 7,697,729 B2 | 4/2010 | Howell et al. |
| 7,752,077 B2 | 7/2010 | Holden et al. |
| 7,773,812 B2 | 8/2010 | Hanus et al. |
| 8,027,468 B2 | 9/2011 | McCloskey |
| 8,061,611 B2 | 11/2011 | Cheung et al. |
| 8,194,919 B2 | 6/2012 | Rodriguez et al. |
| 8,267,321 B2 | 9/2012 | Kuyper-Hammond et al. |
| 8,542,930 B1 | 9/2013 | Negro et al. |
| 8,950,662 B2 | 2/2015 | Soborski |
| 2002/0041712 A1 | 4/2002 | Roustaei et al. |
| 2002/0087869 A1 | 7/2002 | Kim |
| 2002/0113127 A1 | 8/2002 | Takeuchi et al. |
| 2002/0122878 A1 | 9/2002 | Kerns et al. |
| 2002/0171862 A1 | 11/2002 | Nagashige |
| 2003/0021452 A1 | 1/2003 | Hamid |
| 2003/0169456 A1 | 9/2003 | Suzaki |
| 2004/0161153 A1 | 8/2004 | Lindenbaum |
| 2004/0263911 A1 | 12/2004 | Rodriguez et al. |
| 2005/0053236 A1 | 3/2005 | Samii et al. |
| 2005/0161515 A1 | 7/2005 | Lubow |
| 2005/0234857 A1 | 10/2005 | Plutchak et al. |
| 2005/0257064 A1 | 11/2005 | Boutant et al. |
| 2007/0041622 A1 | 2/2007 | Salva Calcagno |
| 2007/0170257 A1 | 7/2007 | Haraszti |
| 2007/0199991 A1 | 8/2007 | Haraszti et al. |
| 2008/0025555 A1 | 1/2008 | Visan et al. |
| 2008/0149725 A1 | 6/2008 | Rosenbaum |
| 2008/0181447 A1 | 7/2008 | Adams et al. |
| 2008/0226297 A1 | 9/2008 | Sinclair et al. |
| 2009/0001164 A1 | 1/2009 | Brock et al. |
| 2009/0169019 A1 | 7/2009 | Bauchot et al. |
| 2009/0232368 A1 | 9/2009 | Niinuma et al. |
| 2010/0027851 A1 | 2/2010 | Walther et al. |
| 2010/0037059 A1 | 2/2010 | Sun et al. |
| 2011/0121066 A1 | 5/2011 | Tian et al. |
| 2012/0145779 A1 | 6/2012 | Bietenbeck et al. |
| 2012/0325902 A1 | 12/2012 | Goyal et al. |
| 2013/0034290 A1 | 2/2013 | Lee et al. |
| 2013/0228619 A1 | 9/2013 | Soborski |
| 2013/0240628 A1 | 9/2013 | van der Merwe et al. |
| 2013/0296039 A1 | 11/2013 | Engineer et al. |
| 2014/0061316 A1 | 3/2014 | Narayanaswami et al. |
| 2014/0078556 A1 | 3/2014 | Anderson, III |
| 2014/0086474 A1 | 3/2014 | Le |
| 2015/0061279 A1 | 3/2015 | Cruz et al. |
| 2015/0083801 A1 | 3/2015 | Soborski |
| 2015/0098655 A1 | 4/2015 | Chang et al. |
| 2015/0262347 A1 | 9/2015 | Duerksen et al. |
| 2016/0342885 A1 | 11/2016 | Toedtli et al. |
| 2016/0371303 A1 | 12/2016 | Voigt et al. |
| 2017/0091611 A1 | 3/2017 | Soborski |
| 2017/0287147 A1 | 10/2017 | Takahashi et al. |

FOREIGN PATENT DOCUMENTS

| | | |
|---|---|---|
| JP | 2004-109172 A | 4/2004 |
| JP | 2005-267598 A | 9/2005 |
| JP | 2007-501976 A | 2/2007 |
| JP | 2009-109419 A | 5/2009 |
| JP | 2009-124599 A | 6/2009 |
| JP | 2012-039494 A | 2/2012 |
| JP | 2012-141729 A | 7/2012 |
| JP | 2016-028363 A | 2/2016 |
| JP | 2017-516214 A | 6/2017 |
| JP | 2017-532670 A | 11/2017 |
| KR | 10-2003-0051712 A | 6/2003 |
| KR | 10-2005-0093715 A | 9/2005 |
| KR | 10-2008-0031455 A | 4/2008 |
| RU | 2 208 248 C2 | 7/2003 |
| RU | 2 370 377 C2 | 10/2009 |
| RU | 2 380 750 C2 | 1/2010 |
| RU | 2 451 340 C2 | 5/2012 |
| RU | 2 458 395 C2 | 8/2012 |
| RU | 2 461 883 C2 | 9/2012 |
| RU | 2 476 936 C2 | 2/2013 |
| RU | 2 507 076 C2 | 2/2014 |
| WO | 96/03714 A1 | 2/1996 |
| WO | 97/24699 A1 | 7/1997 |
| WO | 02/31752 A1 | 4/2002 |
| WO | 02/065782 A1 | 8/2002 |
| WO | 2005/015487 A1 | 2/2005 |
| WO | 2008/078009 A1 | 7/2008 |

(56) References Cited

FOREIGN PATENT DOCUMENTS

| WO | 2009/044352 A1 | 4/2009 |
|---|---|---|
| WO | 2009/115611 A2 | 9/2009 |
| WO | 2010/021965 A1 | 2/2010 |
| WO | 2011/076406 A1 | 6/2011 |
| WO | 2011/077459 A1 | 6/2011 |
| WO | 2013/130946 A1 | 9/2013 |
| WO | 2015/130697 A1 | 9/2015 |
| WO | 2016/035774 A1 | 3/2016 |

OTHER PUBLICATIONS

Office Action issued in related application CN 201580022895.1, dated Sep. 21, 2018, with English language translation, 23 pages.
Notice of Allowance issued in related application JP 2017-564394, dated Oct. 31, 2018, with English language translation, 6 pages.
Notice of Allowance issued in related U.S. Appl. No. 15/180,252, dated Oct. 31, 2018, 9 pages.
Ahmed et al., "The structural microscopically analysis for the full color printers & copiers utilized in valuable secured prints counterfeiting crimes," WAN-IFRA, Mar. 3, 2011, 13 pages.
"Rank, v.3", Def. 3a, OED Online, Oxford English Dictionary, 2nd Ed., 1989, Oxford University Press, <http://www.oed.com/oed2/00197225>.
Seo et al., "A robust image fingreprinting system using the Radon transform," Signal Processing: Image Communication, Elsevier Science Publishers, Amsterdam, NL, Apr. 1, 2004, vol. 19 (4), pp. 325-339.
Examination Report issued in related application AU 2015383137, dated Aug. 18, 2017, 3 pages.
Notice of Acceptance issued in related application AU 2015223174, dated Aug. 18, 2017, 3 pages.
Notice of Acceptance issued in related application AU 2015383137, dated Nov. 24, 2017, 3 pages.
Notice of Acceptance issued in related application AU 2016278954, dated May 9, 2018, 3 pages.
Examination Report issued in related application AU 2016278954, dated Jan. 31, 2018, 6 pages.
Examination Report issued in related application AU 2017234124, dated Sep. 25, 2018, 2 pages.
Office Action issued in related application CA 2,960,716, dated Apr. 13, 2017, 4 pages.
Office Action issued in related application CA 2,960,716, dated Dec. 27, 2017, 5 pages.
Office Action issued in related application CN 201580076348.1, dated Mar. 15, 2018, with English language translation, 16 pages.
Office Action issued in related application CN 2015800629105, dated Jan. 30, 2018, with English language translation, 9 pages.
Extended European Search Report issued in related application EP 15755854.5, dated Feb. 27, 2017, 11 pages.
Supplementary European Search Report issued in related application EP 15844793.8, dated Sep. 13, 2017, 4 pages.
Examination Report issued in related application EP 15844793.8, dated Oct. 6, 2017, 8 pages.
Supplementary European Search Report issued in related application EP 15882884.8, dated Dec. 14, 2017, 4 pages.
Third Party Observation filed in related application EP 13754659.4, dated Nov. 3, 2017, 3 pages.
Extended European Search Report issued in related application EP 16812194.5, dated May 11, 2018, 7 pages.
Extended European Search Report issued in related application EP 13754659.4, dated Oct. 10, 2015, 7 pages.
Examination Report issued in related application EP 15882884.8, dated Jan. 23, 2018, 7 pages.
Office Action issued in related application IL 256161, dated May 31, 2018, with partial English language translation, 3 pages.
Office Action issued in related application IL 253685, dated Jan. 6, 2018, with English language translation, 6 pages.
Office Action issued in related application JP 2016-565026, dated Feb. 3, 2017, with English language translation, 12 pages.
Office Action issued in related application JP 2017-515692, dated Aug. 2, 2017, with English language translation, 5 pages.
Office Action issued in related application JP 2017-564394, dated May 14, 2018, with English language translation, 4 pages.
Office Action issued in related application JP 2017-541598, dated Mar. 7, 2018, with English language translation, 4 pages.
Decision to Grant Patent issued in related application JP 2017-515692, dated Jan. 10, 2018, with English language translation, 6 pages.
Office Action issued in related application KR 10-2017-7026160, dated Nov. 21, 2017, with English language translation, 11 pages.
Office Action issued in related application KR 10-2015-7020798, dated Jul. 11, 2016, with English language translation, 14 pages.
Office Action issued in related application KR 10-2017-7026160, dated Feb. 22, 2018, with English language translation, 19 pages.
Office Action issued in related application KR 10-2018-7001086, dated Feb. 22, 2018, with English language translation, 15 pages.
Examination Report issued in related application MY PI2014002470, dated Nov. 15, 2017, 3 pages.
PCT Search Report and Written Opinion issued in related application PCT/US2015/051517, dated Jan. 11, 2016, 10 pages.
PCT Search Report and Written Opinion issued in related application PCT/US2017/022097, dated May 24, 2017, 17 pages.
PCT Search Report and Written Opinion issued in related application PCT/US2017/064900, dated Jan. 12, 2018, 8 pages.
Search Report issued in related application RU 2016138293108, dated Feb. 7, 2017, with English language translation, 4 pages.
Decision to Grant issued in related application RU 2018101250, dated Apr. 19, 2018, with English language translation, 22 pages.
Decision to Grant issued in related application RU 2017132260, dated Jan. 10, 2018, with English language translation, 27 pages.
Supplementary European Search Report issued in related application EP 17767261.5, dated Mar. 6, 2019, 4 pages.
Examination Report issued in related application EP 177672615, dated Mar. 14, 2019, 8 pages.
Office Action issued in related application MX/2019/009648, dated Mar. 8, 2019, with machine generated English language translation, 7 pages.
Decision to Grant issued in related application RU 2018136107, dated Jan. 16, 2019, with English language translation, 30 pages.
Office Action issued in related application JP 2018-544333, dated Jan. 31, 2019, with English language translation, 4 pages.
Examination Report issued in related application IN 7110/DELNP/2014, dated Feb. 25, 2019, 6 pages.
Notice of Allowance issued in related application KR 10-2018-7029209, dated Mar. 7, 2019, with English language translation, 3 pages.
Deguillaume et al., "Secure hybrid robust watermarking resistant against tampering and copy-attack," Signal Processing, 2003, vol. 83(10), pp. 2133-2170.
Wikipedia, "Discrete wavelet transform," Nov. 27, 2016, <https://en.wikipedia.org/w/index.php? title=Discrete_wavelet_transform &oldid=751698489>, 10 pages.
Examination Report issued in related application AU 2017370656, Jul. 18, 2019, 5 pages.

| | |
|---|---|
| 169 | 195.075 |
| 165 | 190.825 |
| 308 | 149.725 |
| 170 | 149.475 |
| 309 | 149.15 |
| 307 | 148.6 |
| 603 | 148.2 |
| 604 | 147.975 |
| 310 | 147.9 |
| 167 | 146.725 |
| 306 | 146.7 |
| 171 | 146.575 |
| 602 | 146.375 |
| 605 | 146.375 |
| 311 | 146.075 |
| 142 | 145.875 |
| 143 | 145.65 |
| 606 | 145.65 |
| 607 | 145.15 |
| 253 | 144.7 |
| 312 | 144.4 |
| 404 | 144.35 |
| 608 | 144.35 |
| 234 | 144.3 |
| 144 | 144.225 |
| 252 | 144.15 |
| 141 | 144.125 |
| 166 | 144.025 |

METHODS AND A SYSTEM FOR VERIFYING THE AUTHENTICITY OF A MARK

CROSS-REFERENCE TO RELATED APPLICATIONS

The present application is a continuation of U.S. patent application Ser. No. 14/845,099, filed on Sep. 3, 2015, which is a continuation-in-part of U.S. patent application Ser. No. 14/561,215, filed Dec. 4, 2014, and which claims priority to U.S. Provisional Patent Application 62/053,905, filed Sep. 23, 2014.

TECHNICAL FIELD

The present disclosure is related generally to machine vision technology and, more particularly, to methods and a system for verifying the authenticity of a mark.

BACKGROUND

Counterfeit products are, unfortunately, widely available and often hard to spot. When counterfeiters produce fake goods, they typically copy the labeling, which may include a bar code or other type of mark, in addition to the actual products. At a superficial level, a counterfeited mark may appear genuine and even yield valid data when scanned (e.g., decode to the appropriate Universal Product Code). Many of the technologies currently available to counter such copying rely on the basic idea of visually comparing an image of a possible counterfeit mark with an image of an original mark.

A mark may be subjected to mechanical damage when the product on which the mark is located is handled, packed, shipped, etc. Damage may occur in some unknowable way, resulting in unpredictable changes to the mark. Typical forms of damage include scratches, ink runs, ink flaking off a surface, and dirt obscuring parts of the mark—any of which can distort the mark so that, even if the mark is genuine, it no longer resembles the original. As a result, the process conducting the comparison (e.g., image comparison software) may erroneously deem the mark being tested as counterfeit (a "false negative").

DRAWINGS

While the appended claims set forth the features of the present techniques with particularity, these techniques may be best understood from the following detailed description taken in conjunction with the accompanying drawings of which:

Figure 19:
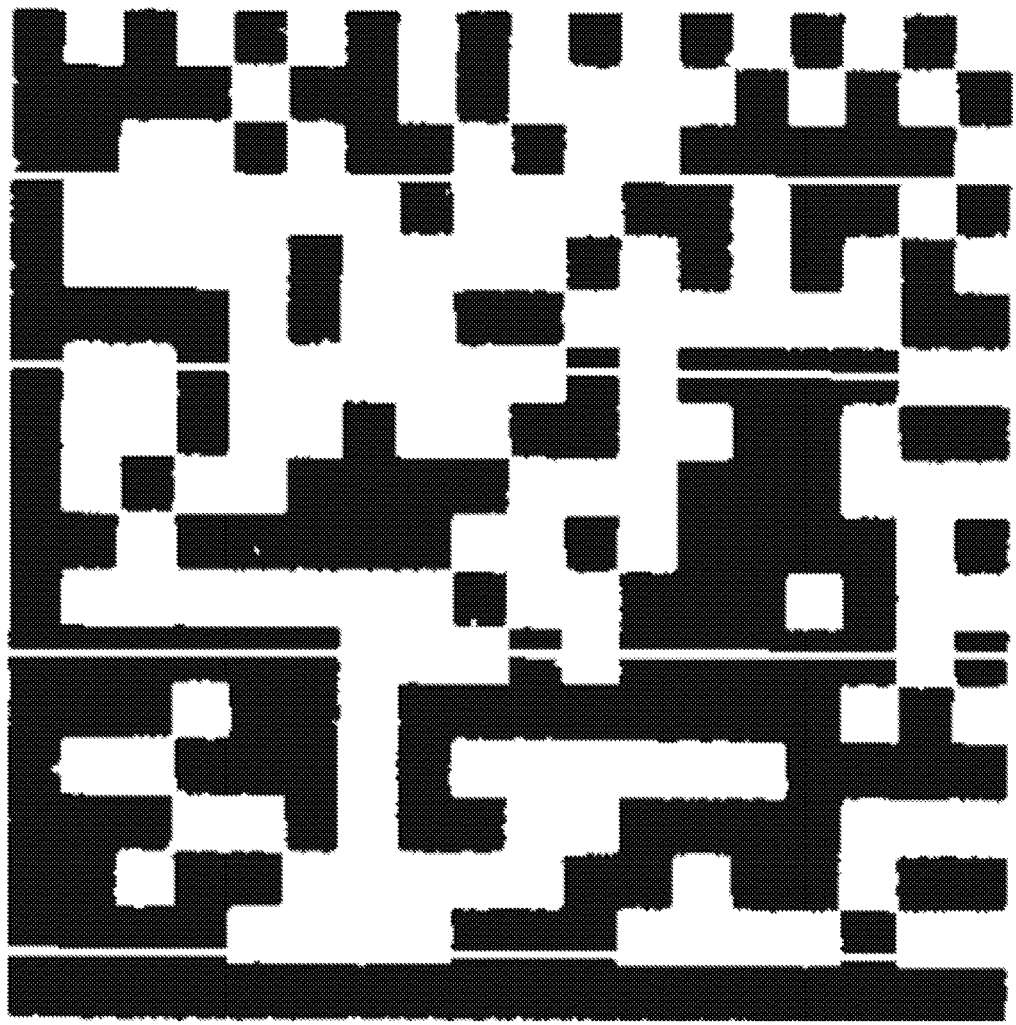
FIG. 19 is a second example of the mark of FIG. 17 after it has been damaged.
Figure 24:
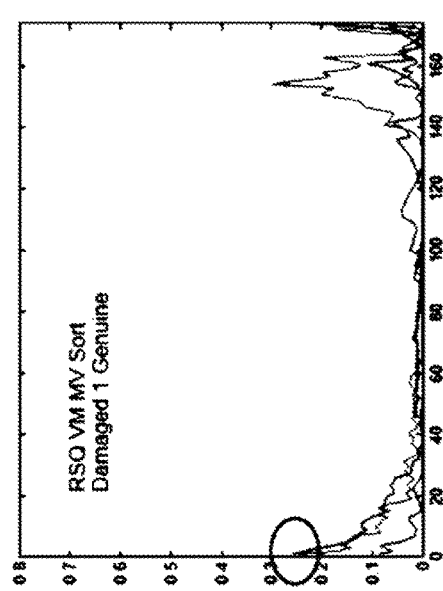

FIG. 24 is a plot of the correlation of values of a series of metrics representing the signature of the candidate mark of FIG. 19 (after elimination of metrics indicating damage) against the stored series of metrics representing the signature for the genuine mark (after elimination of metrics corresponding to the metrics of the candidate signature that were eliminated), indicative of a match (a correct result, in this instance).

Figure 20:
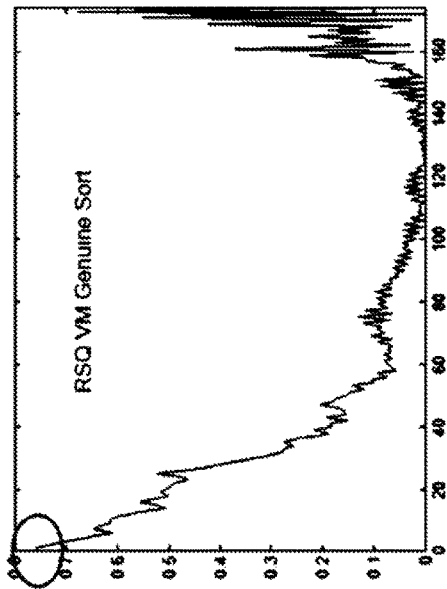
FIG. 20 is a plot of the correlation of values of a series of metrics representing the signature of the candidate mark of FIG. 17 against a stored series of metrics representing the signature for the original mark, indicative of a match.
Figure 25:
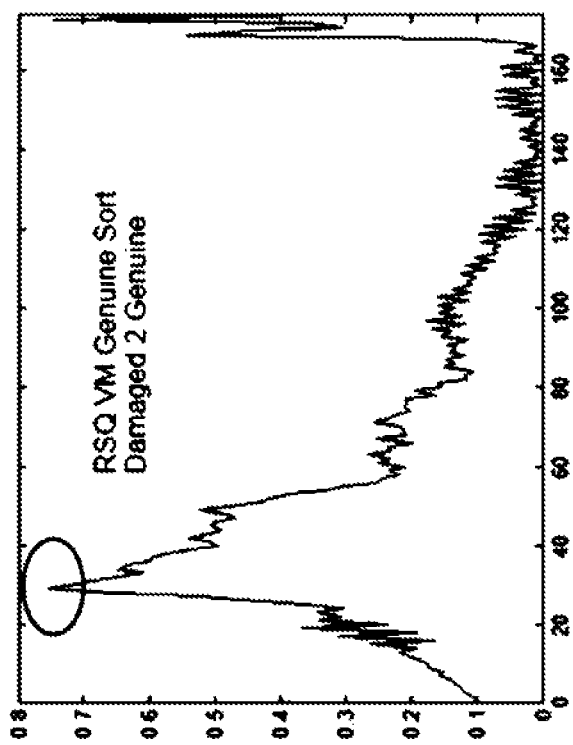

FIG. 25 is a plot of the correlation of values of a series of metrics representing the signature of the candidate mark of FIG. 20 (after elimination of metrics indicating damage) against the stored series of metrics representing the signature for the genuine mark (after elimination of metrics corresponding to the eliminated metrics), indicative of a match (a correct result, in this instance).

Figure 26:
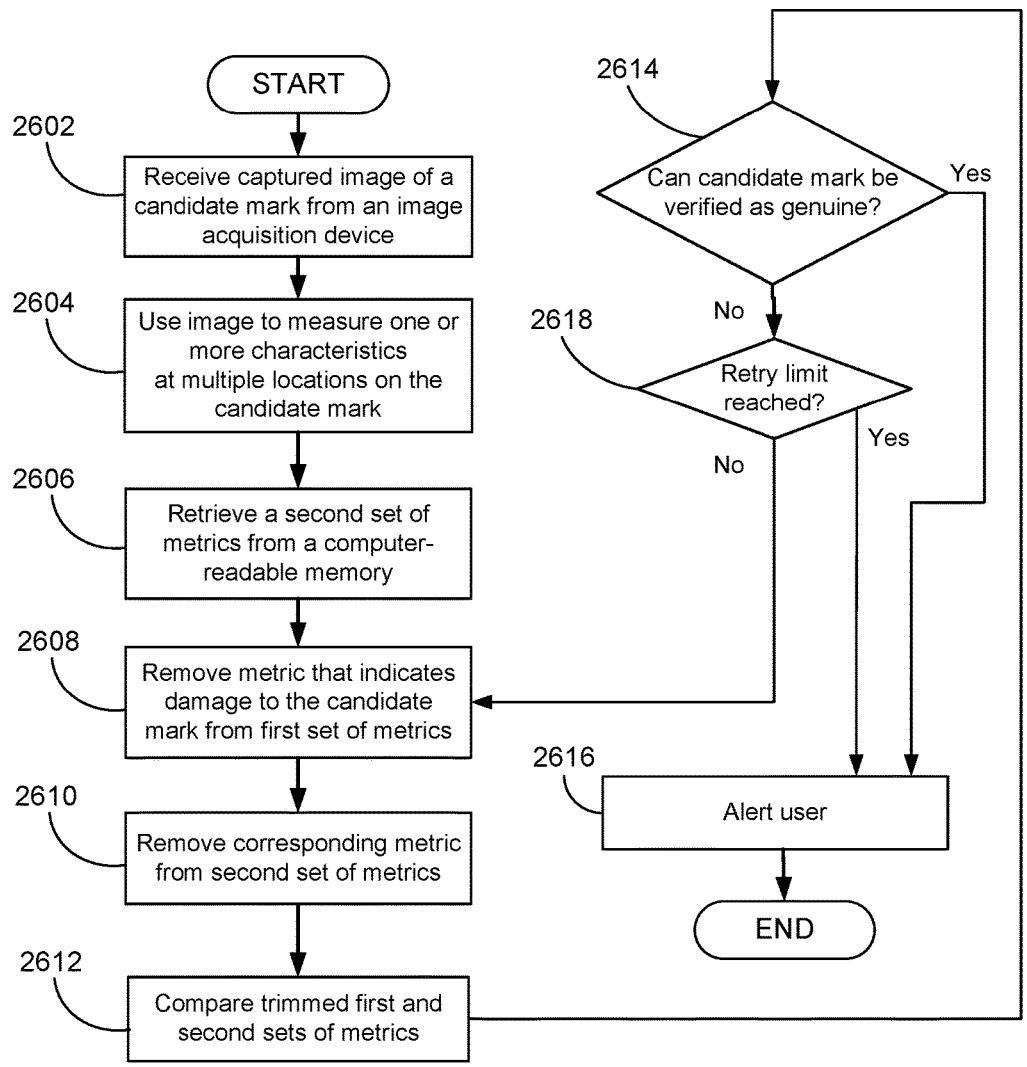

FIG. 26 is a flow chart depicting actions carried out according to an embodiment.

FIG. 27 shows an example of a set of data metrics according to an embodiment.

Figure 28:
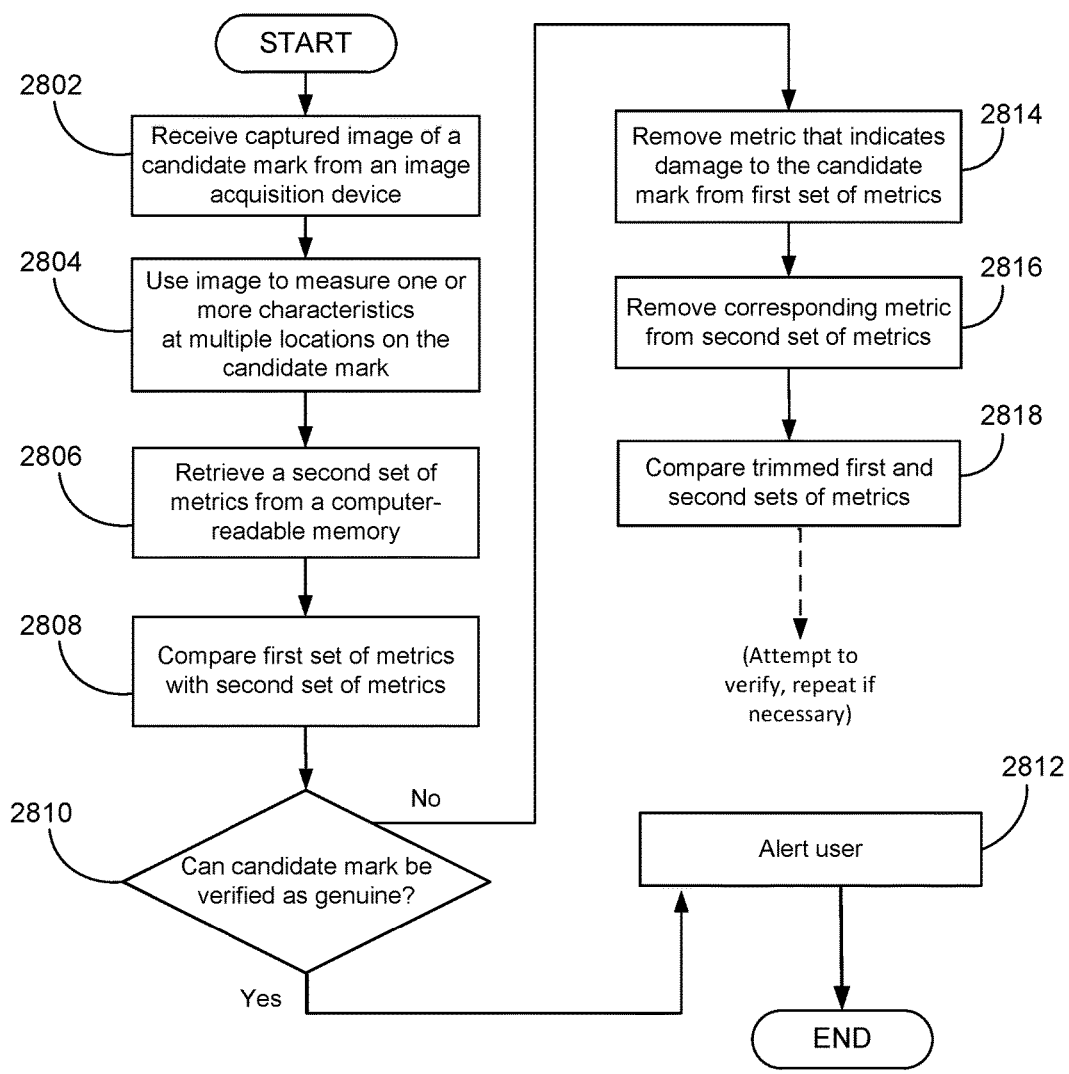
Figure 29:
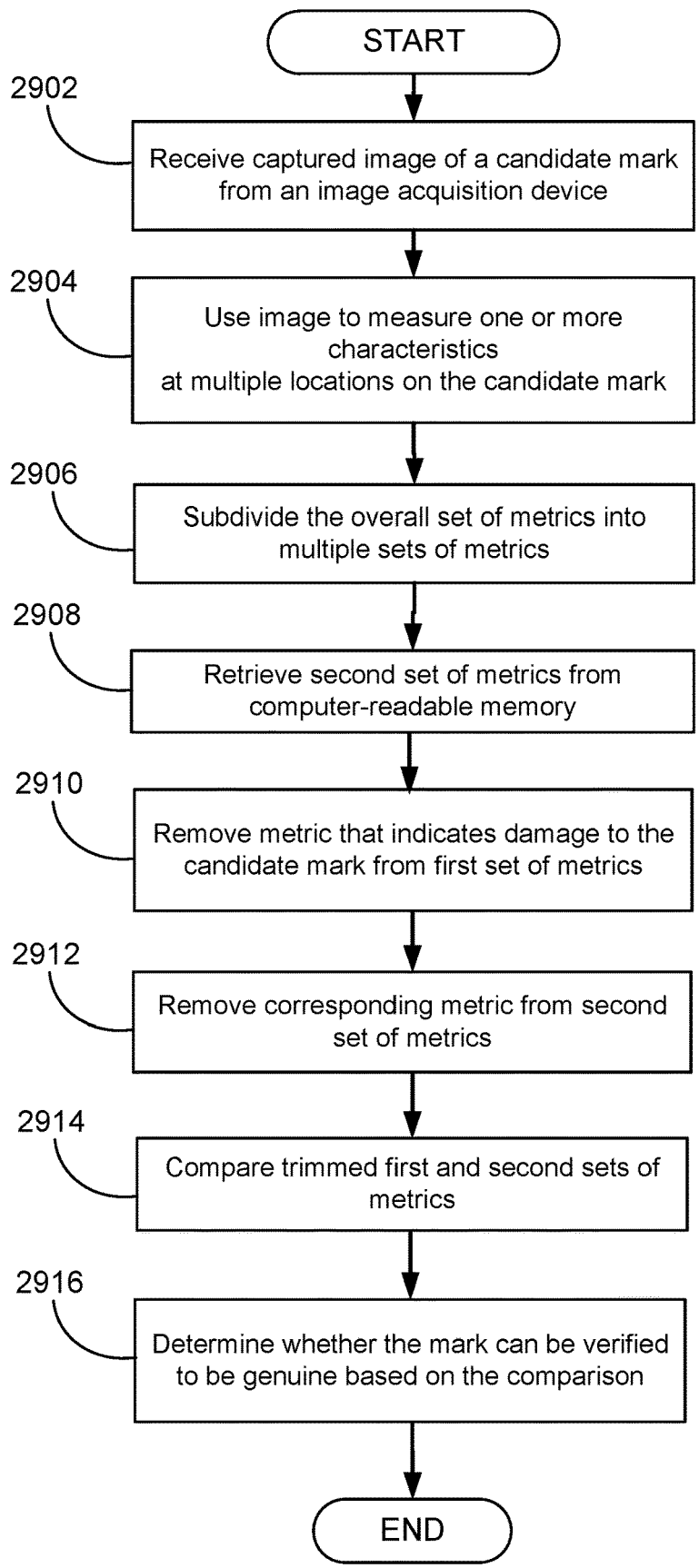

FIG. 28 and FIG. 29 are flow charts depicting actions carried out according to respective embodiments.

Figure 30:
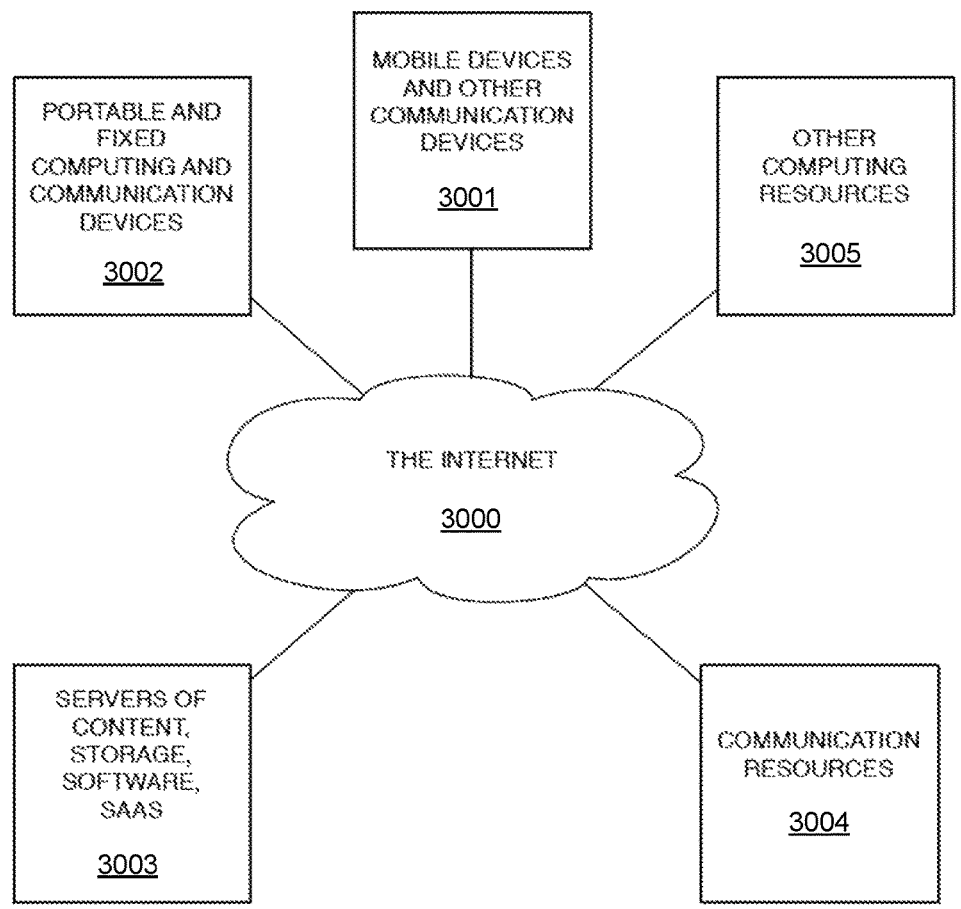

FIG. 30 is a block diagram of a hardware environment according to an embodiment.

Figure 31:
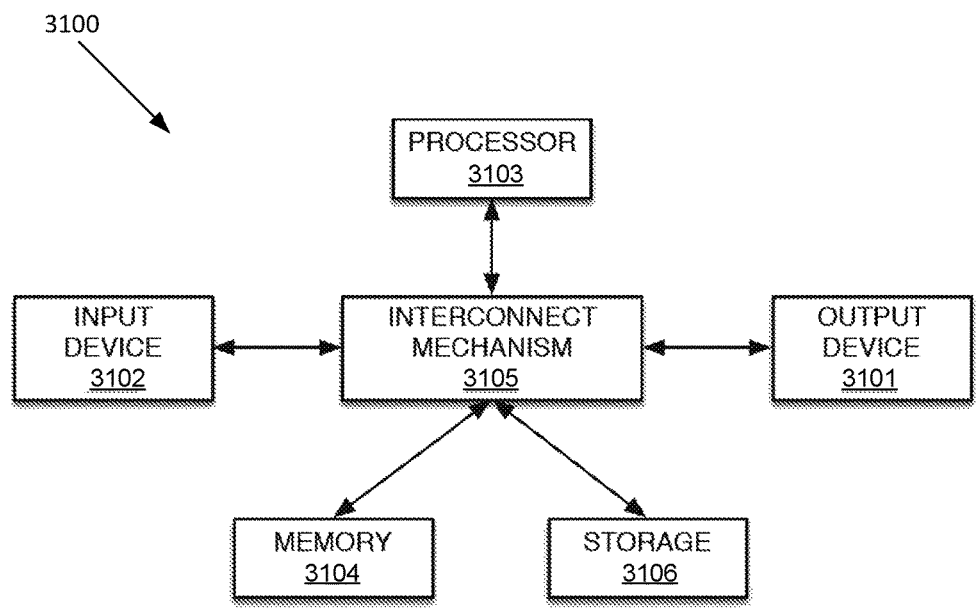

FIG. 31 is a block diagram of a computer system according to an embodiment.

Figure 32:
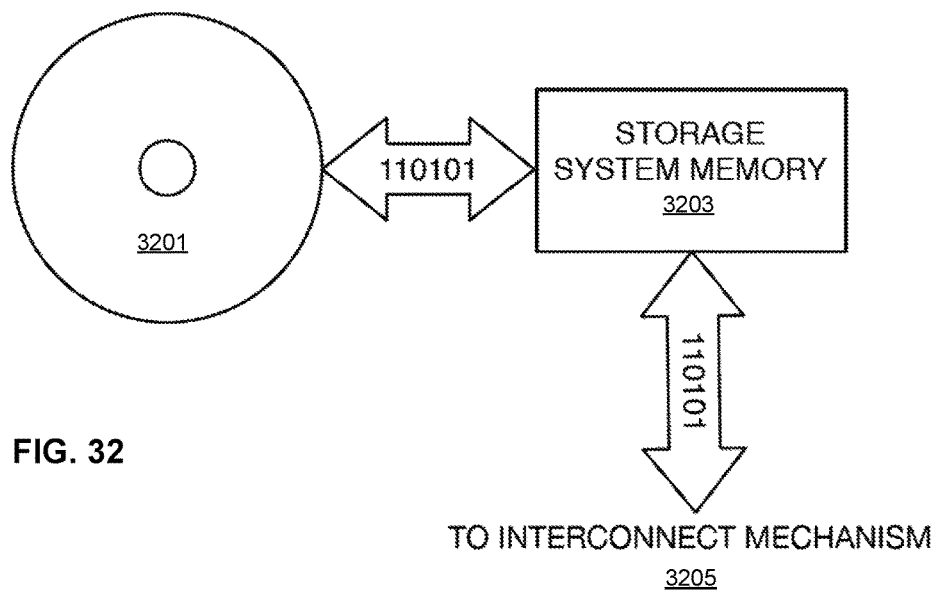

FIG. 32 is a block diagram of a storage system according to an embodiment.

DESCRIPTION

The disclosure is generally directed to a method for verifying the authenticity of a mark. In an embodiment, a processor: (1) receives an image of a candidate mark from an image acquisition device, (2) uses the image to measure one or more characteristics at a plurality of locations on the candidate mark, resulting in a first set of metrics, (3) removes, from the first set of metrics, a metric having a dominant amplitude, resulting in a trimmed first set of metrics, (4) retrieves, from a computer-readable memory, a second set of metrics that represents one or more characteristics measured at a plurality of locations on an original mark, (5) removes, from the second set of metrics, a metric corresponding to the metric removed from the first set of metrics, resulting in a trimmed second set of metrics, (6) compares the trimmed first set of metrics with the trimmed second set of metrics, and (7) determines whether the candidate mark is genuine based on the comparison.

According to another embodiment, the processor compares the first and second set of metrics and determines whether the candidate mark is genuine based on the comparison and, if the candidate mark is determined not to be genuine, the processor carries out the additional steps of (1) removing a metric having a dominant amplitude from the first set, resulting in a trimmed first set of metrics, (2) removing a corresponding metric from the second set, resulting in a trimmed second set of metrics, (3) comparing the trimmed first set of metrics with the trimmed second set of metrics, and (4) determining whether the candidate mark is genuine based on the comparison According to various embodiments, instead of sorting the signature data based on the prominence of each artifact in the original, learned mark, a processor: (1) uses the prominence of each artifact in the signature data of the candidate mark as the master against which to compare the signature data of the original, learned mark, (2) sorts both sets of signature data according to that ordering, (3) progressively trims the signature data of both marks downward beginning with the most prominent artifact, and (4) performs a statistical correlation between the signature data of the original mark and the signature data of the candidate mark. In an embodiment, trimming the data means reducing the data to be correlated by leaving the next highest magnitude artifact out of each successive statistical correlation. In other words, trimming the data in an embodiment includes removing, from a set of metrics of the signature data of the candidate mark, the metric having the highest magnitude, and also removing the corresponding metric from a set of metrics of the signature data of the original mark. Since regions of mechanical damage tend to be among the highest magnitude features within a signature data set, this has the effect of removing the offending corruptions from the signature data, allowing the underlying correlation of the lower-magnitude true signature data to emerge.

Figure 1:
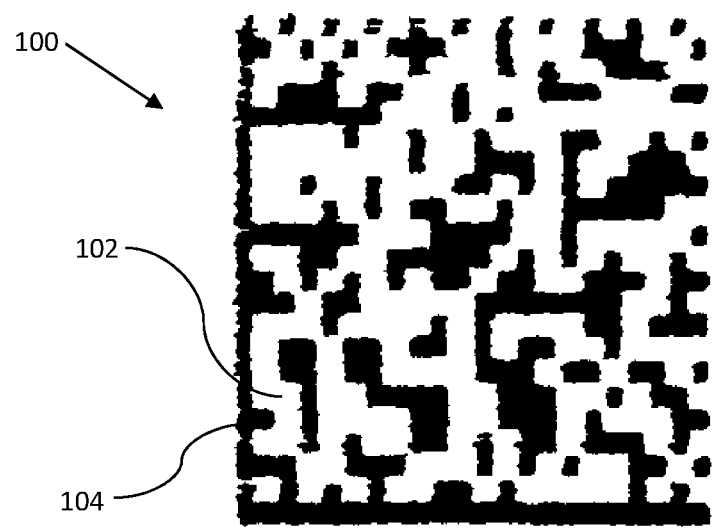
FIG. 1 is an example of a mark.
Figure 17:
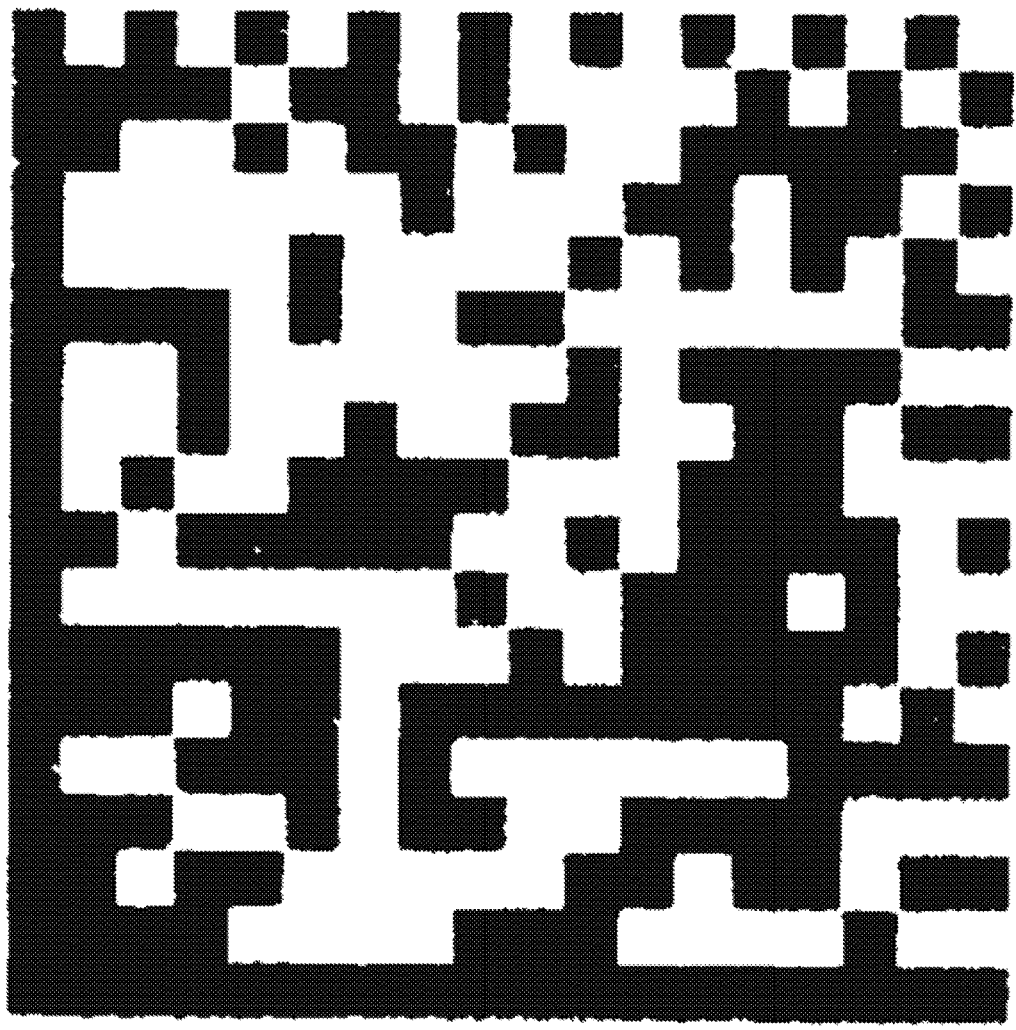
FIG. 17 is an example of a genuine, undamaged candidate mark having the form of a printed, two-dimensional bar code

Some marks to which the techniques described herein are applicable include two-dimensional bar codes, such as QR codes, examples of which are shown in FIGS. 1 and 17. Some two-dimensional bar codes include built-in error correction or redundancy. In two-dimensional codes or other marks into which Reed-Solomon error correction or other redundancy is incorporated, removal of the damage signal in various embodiments is facilitated by taking advantage of the information provided by the error correction or other redundancy. Since such codes identify the damaged areas as part of their function of correcting missing code information, that information can be used to directly exclude the regions identified as damaged, prior to performing the correlation step of signature analysis.

According to another embodiment, the processor carries out successive divisions or successive subdivisions on the metrics of a candidate mark in order to remove a damage signal. In one example, where a mark has a straight edge to be analyzed, such as the finder bar of certain two-dimensional bar codes, the processor successively subdivides a damaged finder bar into 2, then 4, then 8, etc. divisions. The processor observes individual signature correlations of the divisions and subdivisions as it successively subdivides them.

This disclosure will often refer to a "mark." As used herein, a "mark" is visible in some portion of the electromagnetic spectrum, though not necessarily with the naked eye, and is intentionally put on a physical object. A mark may be used for the purpose of uniquely identifying an item, as with a serial number, for example, or may be used for some other purpose, such as branding (e.g., a logo), labeling, or decoration. A mark may be printed, etched, molded, formed, transferred, or otherwise applied to the item using various processes. A mark may be acquired such that it can be processed in electronic form. Possible devices that may be used for electronic acquisition of the marks include machine vision cameras, bar code readers, line scan imagers, flatbed scanners, and hand-held portable imaging devices. A mark may be something that something that bears information, such as a barcode (e.g., a two-dimensional ("2D") barcode as specified in the International Organization for Standardization ("ISO") and the International Electrotechnical Commission ("IEC") standard ISO/IEC 16022), an expiration date, or tracking information such as a serial number).

In various embodiments, an original, genuine mark includes artifacts whose characteristics can be represented by data that will often be referred to herein as a "signal," "signature," or "signature signal." A candidate mark, whether it turns out to be genuine or counterfeit, also includes artifacts whose characteristics can be similarly represented by data. In an embodiment, the processor isolates, from the signature signal of a candidate mark, artifacts created by damage from those signature signal artifacts produced by the source marking equipment. The processor also extracts that underlying signature signal data from the candidate mark.

The term "artifact" of a mark as used herein is a feature of a mark that was produced (controllably or uncontrollably) by the machine or process that created the mark.

The term "processor" as used herein means a circuit (a type of electronic hardware) designed to perform complex functions defined in terms of mathematical logic. Examples of logic circuitry include a microprocessor, a controller, or an application-specific integrated circuit. When the present disclosure refers to a computer system carrying out an action, it is to be understood that this can also mean that processor integrated with the computing device is, in fact, carrying out the action.

Referring now to the drawings, in FIG. 1 there is shown an example of an original printed mark ("original mark") 100 to which various methods described herein may be applied. In this example, the original mark 100 is a 2D barcode. This barcode is a data-carrier of information, where the information is encoded as a pattern of light areas 102 and dark areas 104 of the original mark 100. A possible implementation of the 2D barcode includes a rectangular grid, in which each cell or "module" (e.g., modules 102 and 104) in the grid is either black or white, and represents a bit of data.

Figure 2:
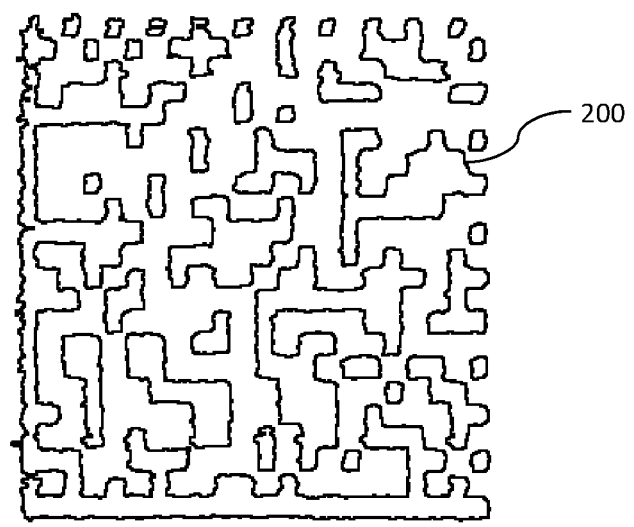
FIG. 2 is an illustration of the mark in FIG. 1, with the mark's edge features extracted for clarity.

FIG. 2 provides an enhanced view of some of the variations present in the original mark 100. FIG. 2 shows only the edges 200 between light and dark areas of the mark 100. Characteristics such as edge linearity, region discontinuities, and feature shape within the mark 100 are readily apparent. Numerous irregularities along the edges of the mark's printed features are clearly visible. Note that this illustration is provided for clarity and is not necessarily a required processing step. In some embodiments, edge linearity is a significant characteristic and is therefore used. In some embodiments, characteristics other than edge linearity are used.

Figure 3:
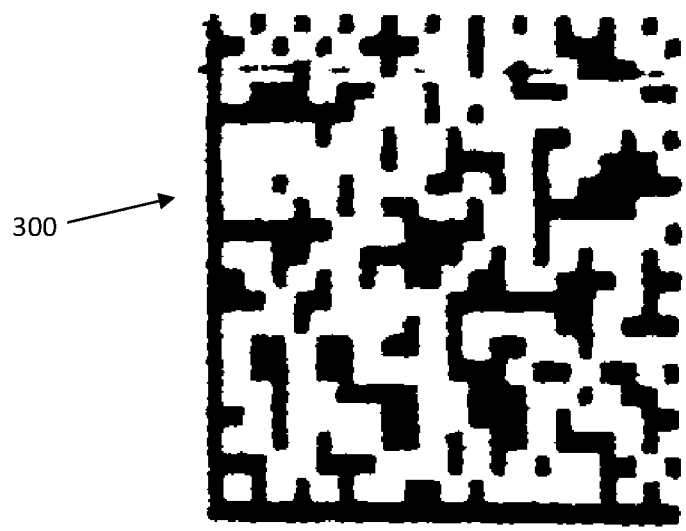
FIG. 3 is an illustration of a second, possibly counterfeit, instance of the mark of FIG. 1.

FIG. 3 shows an example of a candidate printed mark 300 ("candidate mark"), which may be genuine or counterfeit (i.e., represent a counterfeit instance of the original mark 100 shown in FIG. 1, or may represent a second unique instance of the original mark 100 for identification purposes. This candidate mark 300 is also a 2D barcode that, even if counterfeit, presents the same decoded information as the original mark 100 of FIG. 1 when read with a 2D barcode reader. When the candidate mark 300 of FIG. 3 is acquired, in an embodiment, significant features are identified. Characteristics of these features are measured and captured as signature data that uniquely identifies the candidate mark 300. As in the case of FIG. 1, this signature data is derived from the physical and optical characteristics of the mark's geometry and appearance and can include data that is encoded in the mark (e.g., if the mark is a data-carrying symbol such as a 2D barcode). In an embodiment, the properties of the original mark that are evaluated for creating the signature data are the same properties used in evaluating the candidate mark, so that the two signatures are directly comparable.

Figure 4:
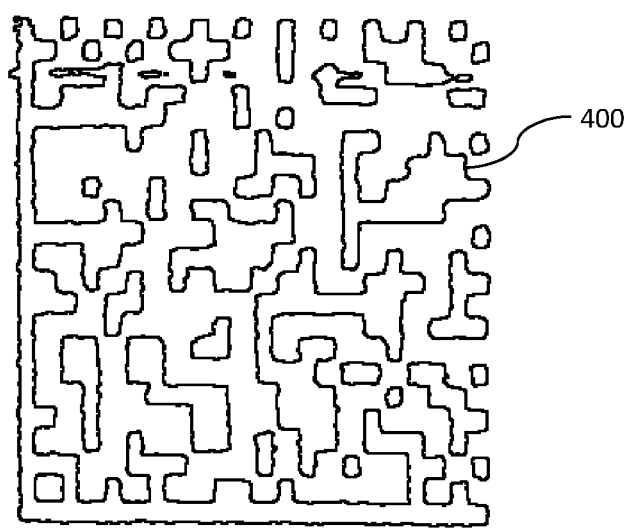
FIG. 4 is an illustration of the mark in FIG. 3, with the mark's edge features extracted for clarity.

FIG. 4 provides an enhanced view of some of the variations present in the candidate mark 300 shown in FIG. 3. FIG. 4 shows only the edges 400 of the mark shown in FIG. 3, similarly to FIG. 2. The corresponding characteristics, such as edge linearity, region discontinuities, and feature shape within the mark shown in FIG. 3 are readily apparent.

Figure 5:
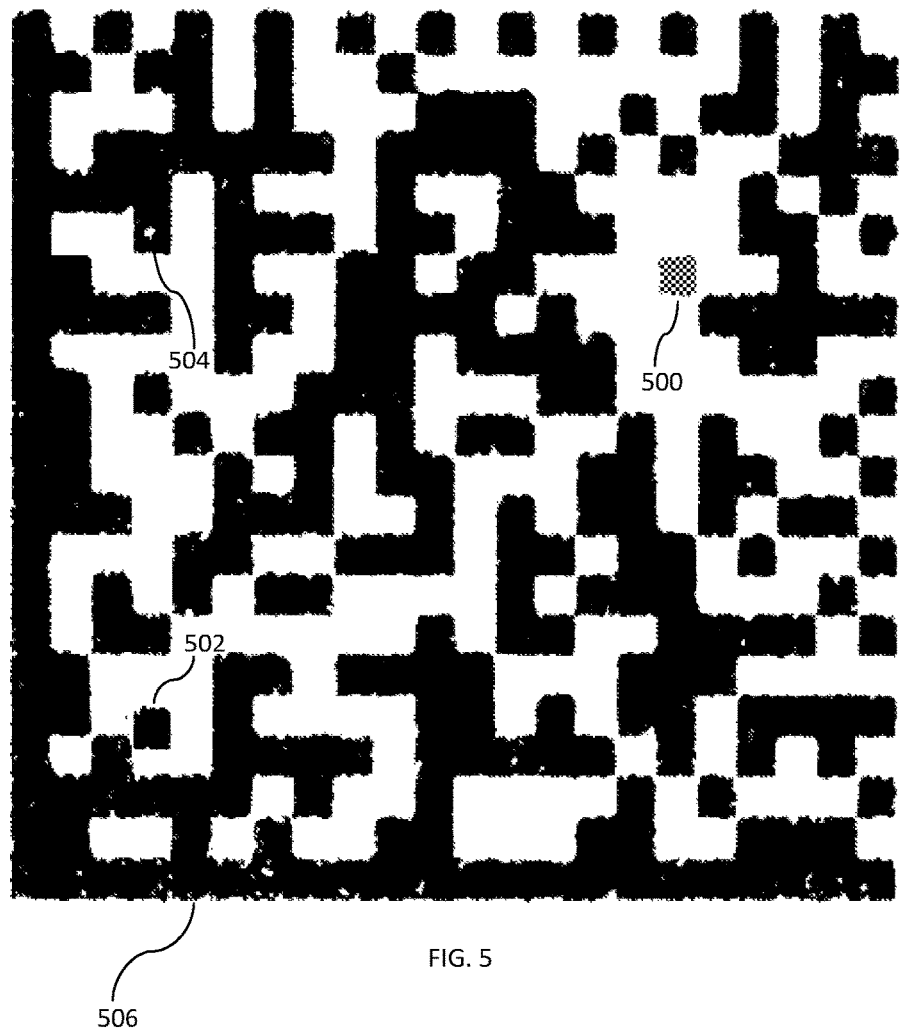
FIG. 5 is an example of a two-dimensional data matrix printed by a thermal transfer process.

Turning to FIG. 5, examples of some of the features that may be used to generate signature data for a mark are shown (features 500, 502, 504, and 506). The characteristics of these features that may be measured include deviation in an average module pigmentation or marking intensity (e.g., feature 500), a module position bias relative to a best-fit grid (e.g., feature 502), the presence or location of extraneous printed spots or unprinted voids (e.g., feature 504) in the mark, and the shape (linearity) of long continuous edges (e.g., feature 506). In an embodiment, the measurements carried out on these features serve as the primary metrics forming the unique signature of the mark.

In an embodiment, the metrics that are obtained from a mark may be weighted as part of forming the signature of the mark. For example, the ease with which each of the four metrics illustrated in FIG. 5 can be extracted depends on the imaging resolution, and the metrics can be arranged in order of the resolution required to extract useful data relating to each of the four metrics. In order from lowest to highest resolution, those are (in an embodiment): module pigmentation, module position bias, void/mark location, and edge shape projection. In other words: Low res→High res Module pigmentation→Module Position Bias→Void/Mark Locations→Edge Shape Projection Increasing image fidelity and resolution allows for increasingly precise analysis, making use of the progressively higher precision analytics. For example, in a low resolution image, perhaps only module average pigmentation and module position bias can be extracted with significant confidence, so those results are given more weight in determining the signature match of a candidate mark against the original mark (representing by the stored, genuine data). With a high resolution image, processing can continue all the way up to the fine edge projection metric, and a processor can use that as the highest weight consideration in signature match determination. If there are disagreements with the expected signature among other (lower weight) measures, these may be due to mark damage or artifacts of the image capture device. However, damage, alteration of an original mark, or imager artifacts are generally not likely to result in a modification of a counterfeit mark to coincidently match with high precision the edge projection signature metric of the original mark. Therefore, the edge projection, if highly correlated and exhibiting adequate magnitude in dynamic range, can supersede the lower-resolution metrics in support of a high match confidence.

Further, in an embodiment, the use of Error Correction information as provided by the standard decoding algorithms of that symbology (such that used in 2D Data Matrix codes) is used to further weight signature metric data appropriately. If a data region within the symbol is corrupted by damage to the mark and that region yields a disagreement with stored signature data while other uncorrupt regions agree well, the voting weight of the corrupted region may be diminished. This mechanism prevents detectable symbol corruptions from presenting a false-negative result in a candidate symbol metric comparison against the genuine symbol signature data. The ISO 16022 "Data Matrix Symbol" specification describes an example of how Error Correction Codes ("ECC") can be distributed within a 2D Data Matrix, and how corrupted and uncorrupted regions within a Data Matrix can be identified.

As it is known beforehand that different marking device technologies present superior or inferior signature features in different attributes for use in creating Metrics signature data, the marking device type may be used to pre-weight the metrics in what is referred to as a Weighting Profile. For example, should the genuine marks be created using a thermal transfer printer, it is known that edge projections parallel to the substrate material direction of motion are unlikely to carry a signature magnitude sufficient to encode as part of the genuine signature data. This knowledge of various marking device behaviors may be used during the capture of the original genuine signature data. If employed, metrics used in the creation of the genuine mark signature are weighted as appropriate for the known behaviors of that particular marking device type, and the resulting emphasis/de-emphasis mapping of the metrics becomes a Metrics Weighting Profile.

Figure 6:
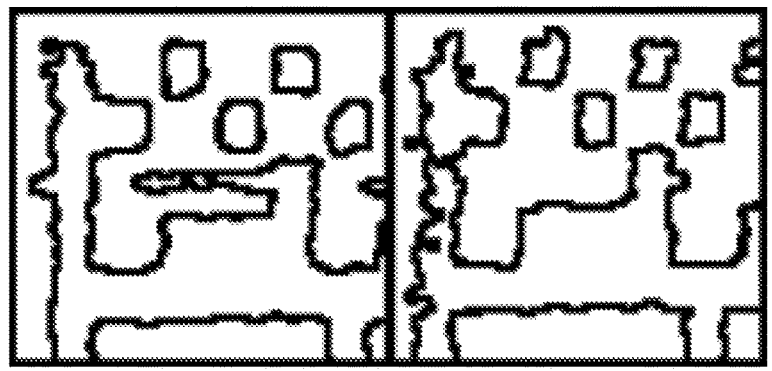
FIG. 6 is an illustration comparing the features of the upper left sections of FIG. 2 and FIG. 4.

FIG. 6 shows a close comparison of the upper left corner features of FIG. 2 and FIG. 4. As may be seen most clearly in FIG. 6, the two printed marks 100 and 300 of FIGS. 1 and 3, even though identical in respect of their overtly coded data, contain numerous differences on a finer scale, resulting from the imperfections of the printing process used to apply the marks. These differences are durable, usually almost as durable as the mark itself, and are practically unique, especially when a large number of differences that can be found between the symbols of FIG. 1 and FIG. 3 are combined. Further, the differences may be difficult to counterfeit, because the original symbol would have to be imaged and reprinted at a resolution much higher than the original printing, while not introducing new distinguishable printing imperfections. While only the upper left corner section of the marks is shown here, differentiable features between the two marks shown in FIGS. 1 and 3 run throughout the entirety of the marks and can be used according to various embodiments.

Figure 7:
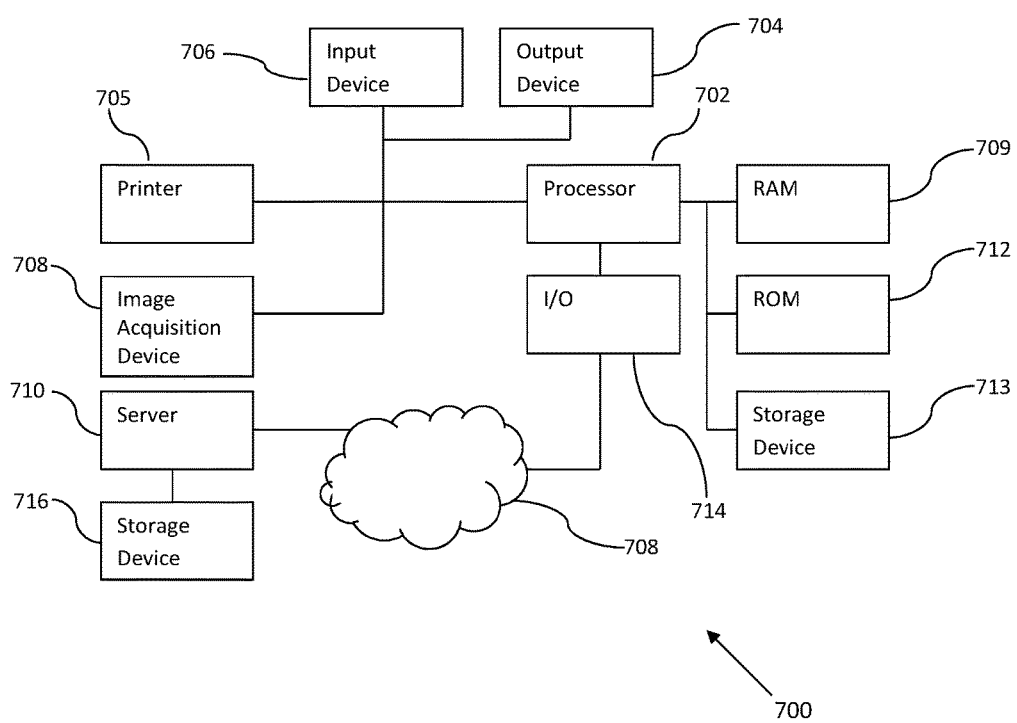
FIG. 7 is a block diagram of a computer system.

Referring to FIG. 7, an embodiment of a computer system 700 includes a central processing unit or processor 702, output and input devices 704 and 706, including an image acquisition device 708, random access memory ("RAM") 709, read-only memory ("ROM") 712, and magnetic disks or other long-term storage ("storage device") 713 for programs and data. The computer system 700 may have a printer 705 for generating original marks, or the printer 705 may be a separate device. The computer system 700 may be connected through an input-output ("I/O") interface 714 to an external network 708 or other communications media, and through the network 708 to a server 710 with a long-term storage device 716. Although not shown in the interests of simplicity, several similar computer systems may be connected to the server 710.

Figure 8:
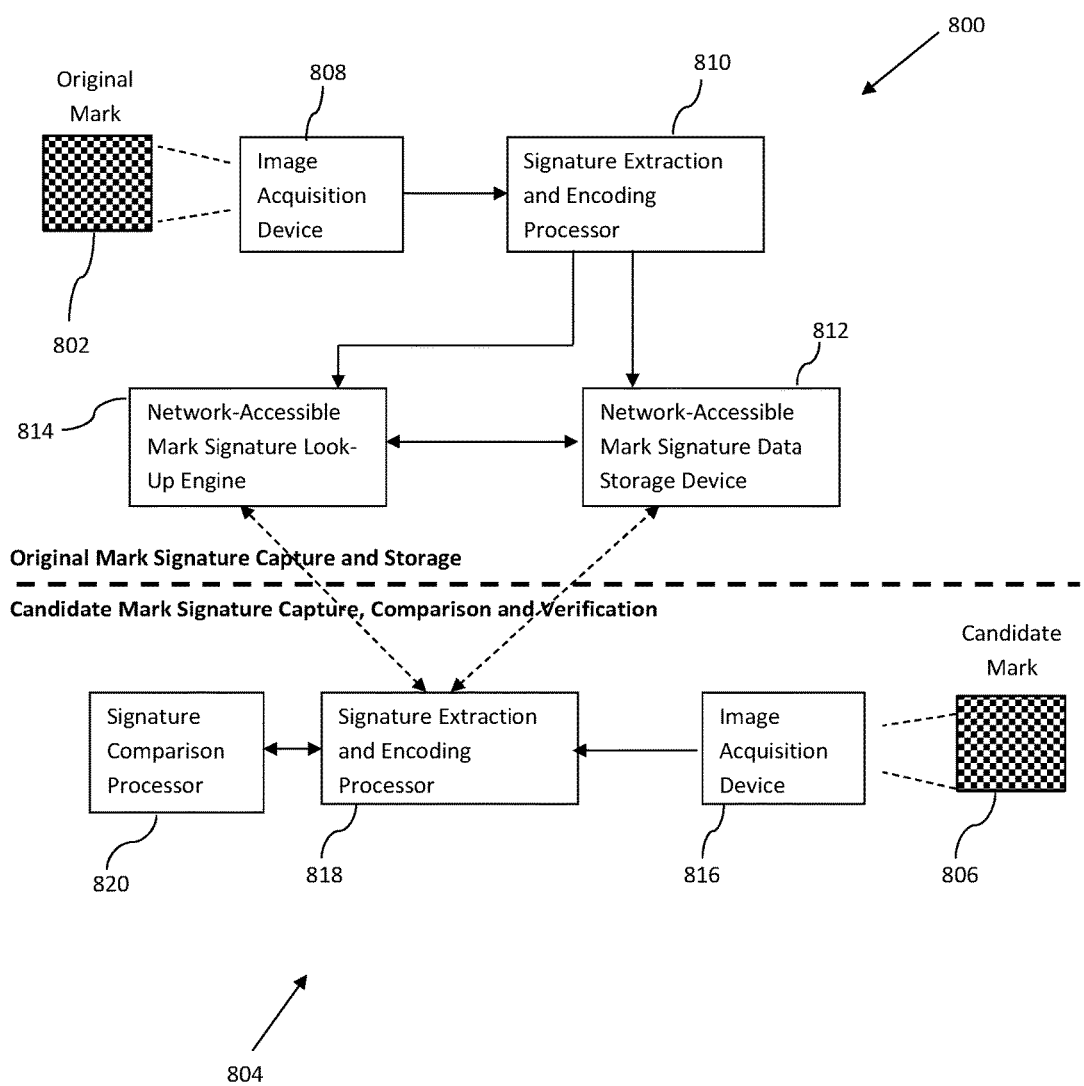
FIG. 8 is a block diagram of a computer system according to an embodiment.

Referring to FIG. 8, an embodiment of the disclosure includes a first computer system 800 that carries out capture and storage operations on an original (i.e., known to be genuine) mark 802, and a second computer system 804 that carries out capture, comparison, and verification on a candidate (i.e., may be genuine or may be counterfeit) mark 806. The first computer system 800 includes an image acquisition device 808 and a signature extraction and encoding processor 810. The image acquisition device 808 captures an image of the original mark 802, generates data regarding the image, and supplies the image data to the signature extraction and encoding processor 810. The signature extraction and encoding processor 810 may be software running on a processor (such as the processor 702 of the computer system 700) or may be a dedicated processor. The signature extraction and encoding processor 810 stores the signature data on a network-accessible mark signature data storage device 812, which may be the long-term storage device 716 of the server 710. In an embodiment, the metrics that make up the signature data are stored as a sorted list in descending order of magnitude, and include information localizing their position in the mark from which they were extracted. A network-accessible mark signature look-up engine 814, which may be software running on a processor (such as the processor 702 of the computer system 700) or may be a dedicated processor, receives signature data from the signature extraction and encoding processor 810 and/or the signature data storage 812.

The second computer system 804 includes an image acquisition device 816, a signature extraction and encoding processor 818, and a signature comparison processor 820. The image acquisition device 816 captures an image of the candidate mark 806, generates data regarding the image, and supplies the image data to the signature extraction and encoding processor 818. The signature comparison processor 818 may compare a signature extracted by the signature extraction and encoding processor 818 from the (recently scanned) candidate mark 806 with a signature previously stored in the signature data storage 812 and associated with the original mark 802. In an embodiment, as shown symbolically by the separation between the upper part of FIG. 8 (relating to original mark signature capture and storage) and the lower part of FIG. 8 (relating to candidate mark signature capture, comparison, and verification), the computer system that scans the candidate mark 806 may be different from the computer system that scanned the original mark 802. If they are different, then they may share access to the signature data storage 812, or a copy of the stored signature data may be passed from the signature data storage 812 on the original mark capture and storage system 800 to the candidate mark signature capture, comparison and verification system 804. In other embodiments, the first computer system 800 and the second computer system 804 are the same system (e.g., the computer system 700 of FIG. 7).

Referring back to FIG. 7, in an embodiment, the processor 702 analyzes an image captured by the image acquisition device 708 in order to measure various characteristics (e.g., physical and optical characteristics) of a mark (e.g., the original mark 100 or the candidate mark 300), resulting in a set of metrics that include data regarding artifacts of the mark. As will be described further, the set of metrics may be one of several sets of metrics that the processor 702 generates about the mark. The processor 702 may carry out the measurements in different locations on the mark. In doing so, the processor 702 can divide the mark into multiple subareas (e.g., in accordance with an industry standard). In an embodiment, if the mark is a 2D barcode, the processor 702 carries out measurements on all of or a subset of the total number of cells of the mark. Examples of characteristics of the mark that the processor 702 may measure include: (a) feature shape, (b) feature aspect ratios, (c) feature locations, (d) feature size, (e) feature contrast, (f) edge linearity, (g) region discontinuities, (h) extraneous marks, (i) printing defects, (j) color (e.g., lightness, hue, or both), (k) pigmentation, and (l) contrast variations. In some embodiments, the processor 702 takes measurements on the same locations from mark to mark for each characteristic, but on different locations for different characteristics. For example, the processor 702 might measure the average pigmentation on a first set of locations of a mark, and on that same first set of locations for subsequent marks, but measure edge linearity on a second set of locations on the mark and on subsequent marks. The two sets of locations (for the different characteristics) may be said to be "different" if there is at least one location that is not common to both sets.

In the case of a mark being a data-carrying symbol, such as a 2D barcode, various embodiments can take advantage of the additional information embodied by and encoded into the mark. The information that is encoded, for example a unique or non-unique serial number, itself may then be included as part of the signature data or used to index the signature data for easier retrieval. Further, in the case of a 2D barcode or other data carrier for which a quality measure can be established, the processor 702 can extract information representing the quality of the mark and included as part of the signature data.

The quality information can be used to detect changes to a genuine candidate mark that might cause a false determination of the mark as counterfeit, as these changes can alter the signature data of the mark. Some of the quality measurements that can be used are, but are not limited to, Unused Error Correction and Fixed Pattern Damage as defined in ISO spec 15415 "Data Matrix Grading processes" or other comparable standard. These measures make it possible to detect areas that would contribute signature data that has been altered by damage to the mark and thus discount it from consideration when comparing a mark's signature data against the stored signature data of the genuine mark.

Figure 9:
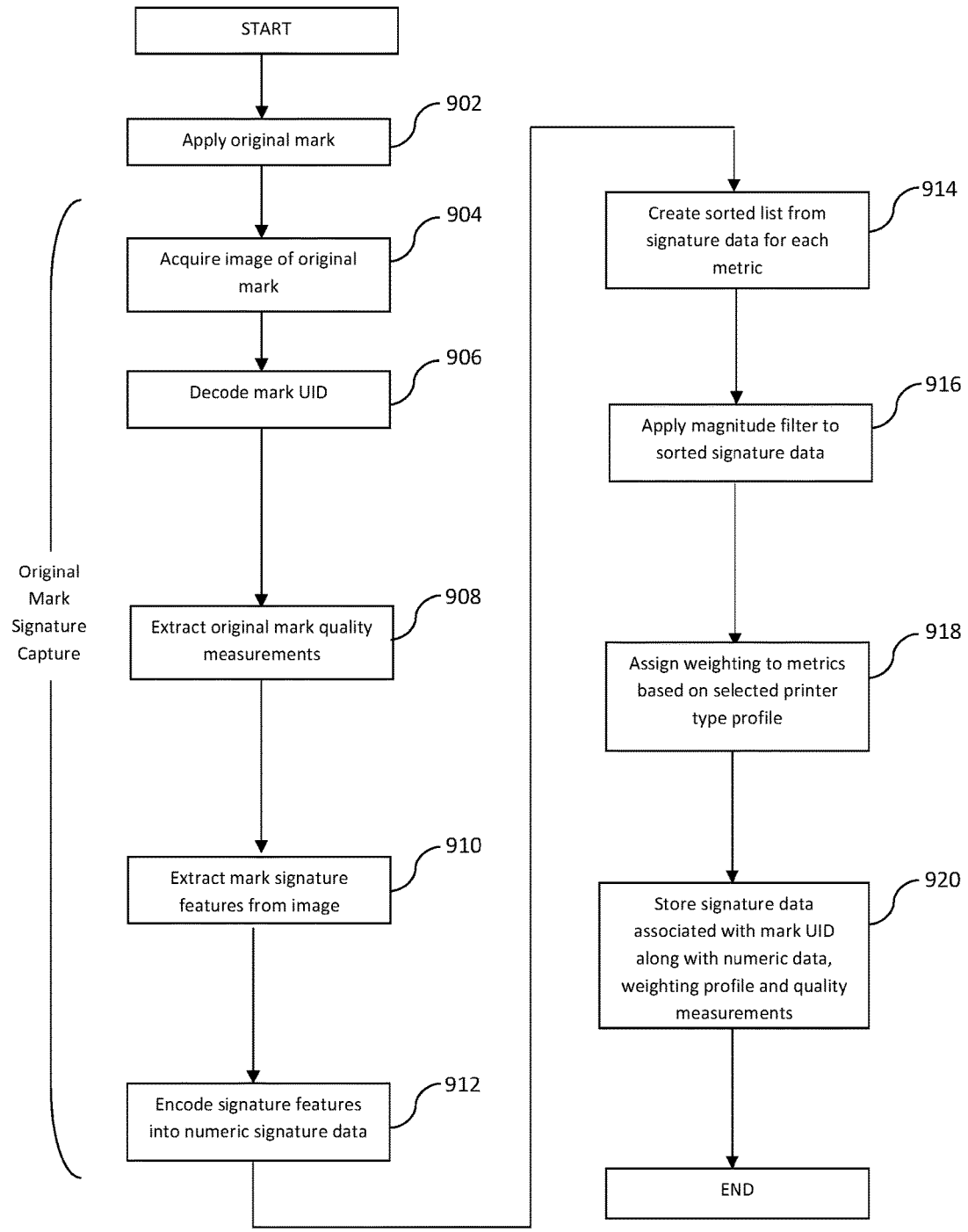
FIG. 9 is a flow chart depicting actions carried out according to an embodiment.

Turning to FIG. 9, a process carried out (e.g., by the computer system 700 or 800, or processor thereof) to capture and store signature data for an original mark according to an embodiment is described. At step 902, an original mark (e.g., a 2D barcode similar to that shown in FIG. 1) is applied to an object, or to a label that is subsequently applied to an object (e.g., by the printer 705).

At step 904, the mark is acquired by a suitable imaging or other data acquisition device, such as the image acquisition device 808. The imaging device that acquires the mark may be of any expedient form, such as a camera, machine-vision device, or scanner. The imaging device may be a conventional device or a device hereafter to be developed. In this embodiment, the imaging device gathers data on characteristics of the mark at a level of detail considerably finer than the controllable output of the device that applied the mark. In the example shown in FIGS. 1-4, the characteristics include the shape of the boundaries between light and dark areas at a resolution considerably finer than the size of the modules of the printed 2D barcode. Other examples of suitable characteristics are described below.

At step 906, a unique identifier ("UID") included in the overt data of original mark is decoded. In an embodiment, if the printer 705 is on the same computer system as the image acquisition device 808, the UID may be passed from one to the other, avoiding the need to decode the UID from the image acquired by image acquisition device 808. If the original mark does not include a UID, some other information uniquely identifying the specific instance of mark may be used in this step.

At steps 908 and 910, the image of the original mark is analyzed by the signature extraction and encoding processor 810. For example, the signature extraction and encoding processor 810 extracts quality measurements from the image of original mark at step 908, and extracts features from the image of the original mark at step 910. At step 912, data relating to the characteristics of the extracted features (e.g., metrics) are encoded into numeric data and stored in the signature data storage 812 as "signature" data that uniquely identifies the original mark. In an embodiment, the record for each mark is indexed under a unique identifier content (typically a serial number) included in the explicitly encoded data in the mark. The record may be stored on a network accessible data storage server or device (such as the storage device 716), or may be stored locally (such as in the storage device 713) where it will be needed. Copies may be distributed to local storage at multiple locations.

At steps 914 and 916, candidate signature features are evaluated to ensure they possess adequate magnitude to act as a part of each signature metric. These steps ensures that the features forming each signature metric possess a real "signal" to encode as a distinguishing characteristic of the mark.

In an embodiment, using a 2D Data Matrix code as an example, at steps 910, 912, and 914, the four characteristics of features of the original mark are extracted and sorted by magnitude. As previously described, an image of a mark is acquired such that the features can be processed in electronic form, typically as a color or gray-scale image. As a preliminary step, the 2D Data Matrix is first analyzed as a whole and a "best fit" grid defining the "ideal" positions of the boundaries between cells of the matrix is determined. Candidate features are then selected by finding features that are most deviant from the "normal" or "optimum" state of the marks attribute(s) for the particular metric being analyzed. Considering the 2D Data Matrix code example shown in FIG. 5, some suitable features are:

1. Parts of the mark whose average color, pigmentation or mark intensity are closest to the global average threshold differentiating dark modules from light modules as determined by the Data Matrix reading algorithms (i.e., the "lightest" dark modules and the "darkest" light modules) (e.g., the feature 500).

2. Modules that are marked in a position that is most deviant from the idealized location as defined by a best-fit grid applied to the mark (e.g., the feature 502). Two possible methods of identifying these modules are: (a) extract the candidate mark module edge positions and compare those edge positions to their expected positions as defined by an idealized, best-fit grid for the mark; (b) extract a histogram of the boundary region between two adjacent modules of opposite polarity (light/dark or dark/light), with the sample region overlapping the same percentage of each module relative to the best-fit grid, and evaluate the deviation of the histogram from a 50/50 bimodal distribution.

3. Extraneous marks or voids in the modules, whether they are light or dark, are defined as modules possessing a wide range of luminance or pigment density (e.g., the feature 504). In other words, they are defined as modules possessing pigmentation levels on both sides of the global average threshold differentiating dark modules from light modules, with the best signature candidates being those with bimodal luminance histograms having the greatest distance between the outermost dominant modes.

4. The shape of the long continuous edges (e.g., the feature 506) in the symbol, such as their continuity/linearity or degree of discontinuity/non-linearity. One method of measuring this attribute and extracting this data is by carrying out a pixel-wide luminance value projection, with a projection length of one module, offset from the best-fit grid by one-half module, run perpendicular to the grid line bounding that edge in the best-fit grid for the symbol.

The 2D Data Matrix makes a good example because it includes square black and white cells, in which the above described features are easily seen. However, the same principles can of course be applied to other forms of data-encoding or non-data-encoding visible mark.

Once candidate features complying with the above-described criteria have been identified, the candidate features are sorted at step 914 into a list in order of magnitude, and are then subjected at step 916 to magnitude limit filtering by finding the first feature in each list that does not satisfy the established minimum magnitude to qualify as a contributor to that metric. The threshold may be set at any convenient level low enough to include a reasonable number of features that cannot easily be reproduced, and high enough to exclude features that are not reasonably durable, or are near the noise-floor of the image acquisition device. In this embodiment, the low-magnitude end of the sorted list is then truncated from that point and the remaining (highest magnitude) features are stored, along with their locations in the mark, as the signature data for that metric. Preferably, all features above the truncation threshold are stored, and that implicitly includes in the signature the information that there are no signature features above the magnitude filter threshold elsewhere in the mark.

At step 918, the weighting profile of the metrics, which is based on the type of marking device used to create the original mark, is stored as part of the signature data.

At step 920, the signature metrics are stored as sorted lists of features, in descending order of magnitude. The list entry for each feature includes information localizing the position in the mark from which that feature was extracted.

Figure 10:
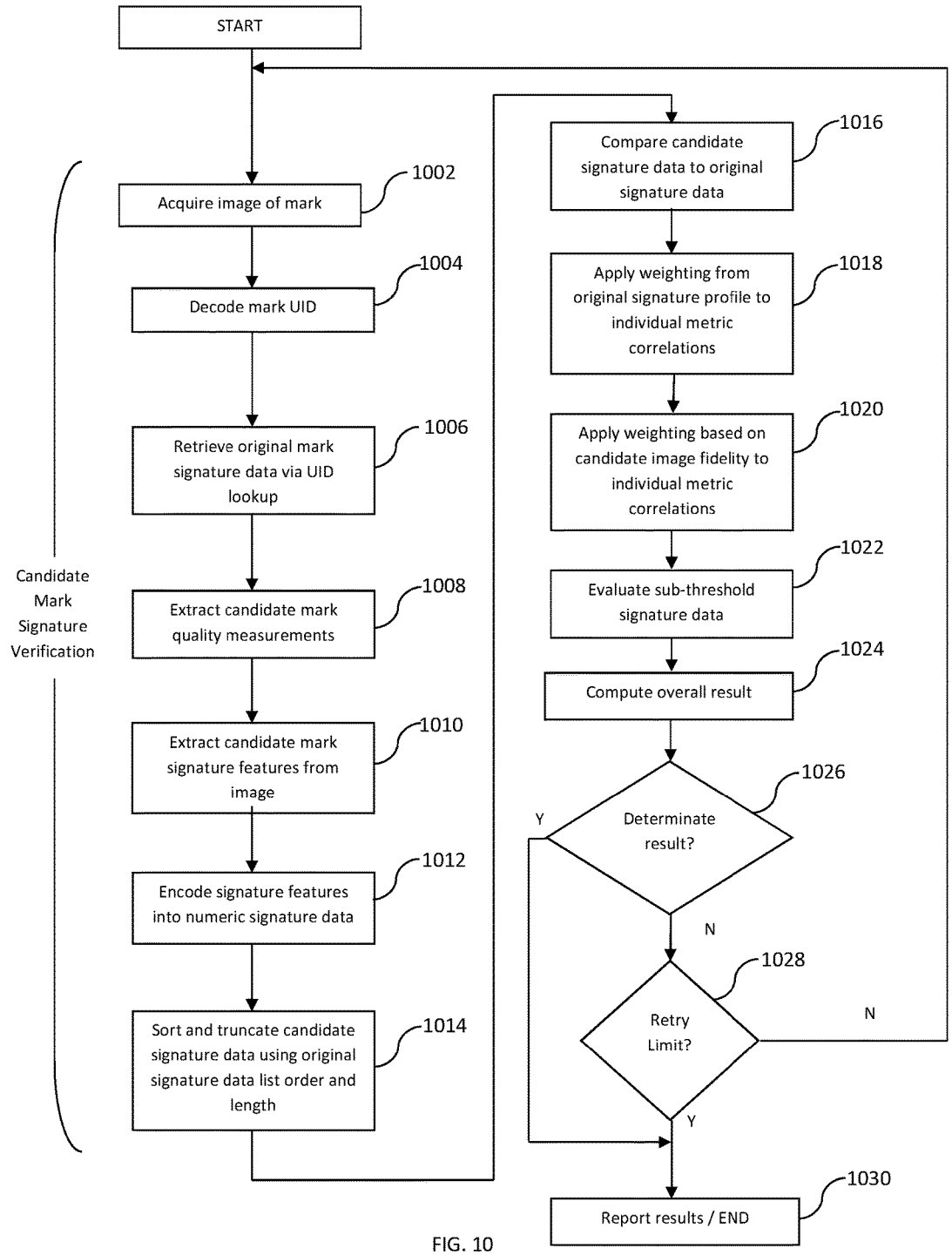
FIG. 10 is a flow chart depicting actions carried out according to an embodiment.

Turning to FIG. 10, a process carried out (e.g., by the computer system 700 or 804, or processor thereof) to capture and verify the signature data for a candidate mark according to an embodiment is described. At step 1002, an image of a candidate mark is acquired by an image acquisition device, such as the image acquisition device 816. At step 1004, the explicit data in candidate mark is decoded and its UID content is extracted.

At step 1006, the UID is used to look up the signature metric data previously stored for the original mark having that UID. The stored data may be retrieved from a local storage, such as the storage device 713, or may be retrieved from a network accessible data storage server or long-term storage, such as the storage device 716. In the case of a candidate mark that does not contain a UID, some other identifying information may be obtained relating to the candidate mark. Alternatively, the entire database of genuine mark signatures (e.g., on the storage device 713 or on the storage device 716) may be searched after step 1014 below, to attempt to locate a genuine signature that matches the candidate mark signature.

At step 1008, in the case of a 2D barcode or other data carrier for which a quality measure can be established, quality measurements 1008 for the candidate mark may be obtained, similarly to those obtained at step 908 for the original mark. The quality measurements may be used in the subsequent analysis steps to reduce the weight given to a mark, or parts of a mark, that appear to have been damaged since it was applied. Also, if the quality measurements of the original mark were stored as part of the signature data for the original mark, the stored quality measurements can be verified against the signature data extracted from the candidate mark.

At step 1010, significant signature features are extracted from the image of candidate mark that was acquired at step 1002. The whole of the candidate mark (other than sections that have been disqualified as corrupt because of ECC errors) is searched for significant features. In addition, the information specifying the locations within the mark from which the original, genuine signature data was extracted is used to specify from where to extract the signature data from the candidate mark. That ensures that a feature present in original mark but absent from candidate mark is noted.

At step 1012, the signature features are encoded for analysis. At step 1014, the signature data (the metrics) extracted from the candidate mark is sorted into the same order (for example, magnitude-sorted) as the previously-generated list of metrics of the original mark. At step 1016, the candidate signature data is compared to the stored original signature data. There are a variety of ways in which this may be carried out. In an embodiment, the data is subjected to a statistical operation revealing numeric correlation between the two data sets. Each metric is subjected to individual numerical analysis yielding a measure reflecting the individual confidence of the candidate symbol as being the genuine item for that metric. If the mark does not contain UID data, and no alternative identifying data is available, it may be necessary to search through a database of similar marks, using the procedures discussed with reference to FIG. 12 below. For example, in the case of the original mark 100 and the candidate mark 300, it may be necessary to search through all genuine marks that have the same overt pattern of black and white modules. The objective of the search is to identify, or fail to identify, a single original mark that is uniquely similar to the candidate mark.

At step 1018, where the Metrics Weighting Profile was stored as part of the genuine signature data, this information is used to emphasize and/or de-emphasize metrics as appropriate for the type of marking device used to create the original genuine marks.

At step 1020, where the image acquisition devices used at steps 904 and 1002 have different sensitivities, the contributions of signature data to the overall analysis result may need to be adjusted. For example, the minimum magnitude threshold used for significant features may need to be set at a level appropriate for the less sensitive image acquisition device, or a particular metric may need to be omitted from the analysis set as it is known not to carry adequate signature magnitude in marks produced by the original marking device. In some cases, a feature that is recognized in one of the higher resolution categories in the scale shown above may be mistaken by a lower-resolution scanner for a feature in a different category. For example, a feature that is seen at high resolution as a black module with a white void may be seen at low resolution as a "low pigmentation module." In general, the resolution of the image acquisition device is used in conjunction with the marking device Metrics Weighting Profile to determine what metrics to emphasize/de-emphasize. In this example, in the low resolution image the feature could exist in the "low pigment" list, but would exist in both the "low pigment" and "void" lists in the high resolution image.

If it is desired to correct explicitly for the resolution of the original and/or verification scan, in many cases the resolution can be determined at verification time by detecting a comparatively abrupt drop in the number of artifacts at the scanner's resolution threshold. Alternatively, where the image acquisition device used in capturing the image of the original mark may be of lower resolution than the image acquisition device used in capturing the image of the candidate mark, the resolution of the scan, or other information from which the resolution can be derived, may be included as metadata with the stored signature, similarly to the Metrics Weighting Profile discussed above.

At step 1022, by exclusion, all locations within a mark not represented in the sorted list of feature locations satisfying the minimum magnitude threshold are expected to be devoid of significant signature features when analyzing a genuine mark. This condition is evaluated by examining the signature feature magnitude at all locations within a candidate mark where sub-threshold features are expected and adjusting the results for the appropriate metric toward the negative when features exceeding the threshold minimum are found. If the significant features are found in a region determined to have been damaged when evaluated for symbol error correction or other quality attributes, the adjustment is diminished or not carried out at all depending on the location of the damage relative to the feature extraction point and the nature of the particular metric involved. For example, if a discrepancy in a signature feature relative to the original mark is extracted from a module of the candidate mark that is near, but not the same as, the damaged module(s), the negative adjustment to the metric because of that feature may be diminished by a proportion that reflects reduced confidence in the metric signature. This is because the former module, being near a known damaged region, may well have suffered damage that affects the metric but falls below the detectable threshold of the quality or ECC evaluation mechanism of the symbology. If the discrepancy is extracted directly from a damaged module, or if the metric is one of the types that spans multiple modules and that span includes the damaged one, the adjustment will not be applied at all.

At step 1024, these individual confidence values are then used to determine an overall confidence in the candidate mark as genuine (or counterfeit), with the individual confidence values being weighted appropriately as described above using image fidelity, resolution and symbol damage information.

At step 1026, it is determined whether the result is sufficiently definite to be acceptable. If the comparison of the signature data yields an indeterminate result (for example, the individual metrics having contradictory indications not resolvable through the use of the data weighting mechanism), and the retry limit has not been exceeded (step 1028), then the user submitting the symbol for verification is prompted to re-submit another image of the symbol for processing, and the process returns to step 1002. Otherwise, the process ends (step 1030).

Once the analysis has been completed successfully, the results of the comparison analysis are reported at step 1030. The report may be pass/fail, or may indicate the level of confidence in the result. These results may be displayed locally or transferred to a networked computer system or other device for further action.

Local Reference Measurements for Metric Data for Environmental Immunity

To further make the extraction of accurate signature data robust in an embodiment, various methods described herein may utilize area-local referencing within the analyzed symbol for composing the signature data. This provides greater immunity to things like the aforementioned substrate distortion, non-uniform lighting of the candidate symbol when acquired for processing, non-ideal or low quality optics in the acquiring device, or many other environmental or systematic variables. In an embodiment, the metric reference localizations are:

1. Average module color, pigmentation or mark intensity reference the nearest neighbor(s) of the opposite module state (dark vs. light or light vs. dark). Where a cell is identified as a significant feature with deviant average pigmentation density, the cells for which it was a nearest neighbor may need to be reassessed discounting the identified deviant cell as a reference.

2. Module grid position bias is referenced to the overall symbol best fit grid, and as such has native adaptive reference localization.

3. The analysis of extraneous marks or voids in the symbol modules uses module-local color, pigmentation, or mark intensity references. In other words, the image luminance histogram within the analyzed module itself provides reference values for the applied methods.

4. The projection methods used to extract the shapes of long continuous edges in the symbol are differential in nature and have native immunity to typical impacting variables.

Figure 11:
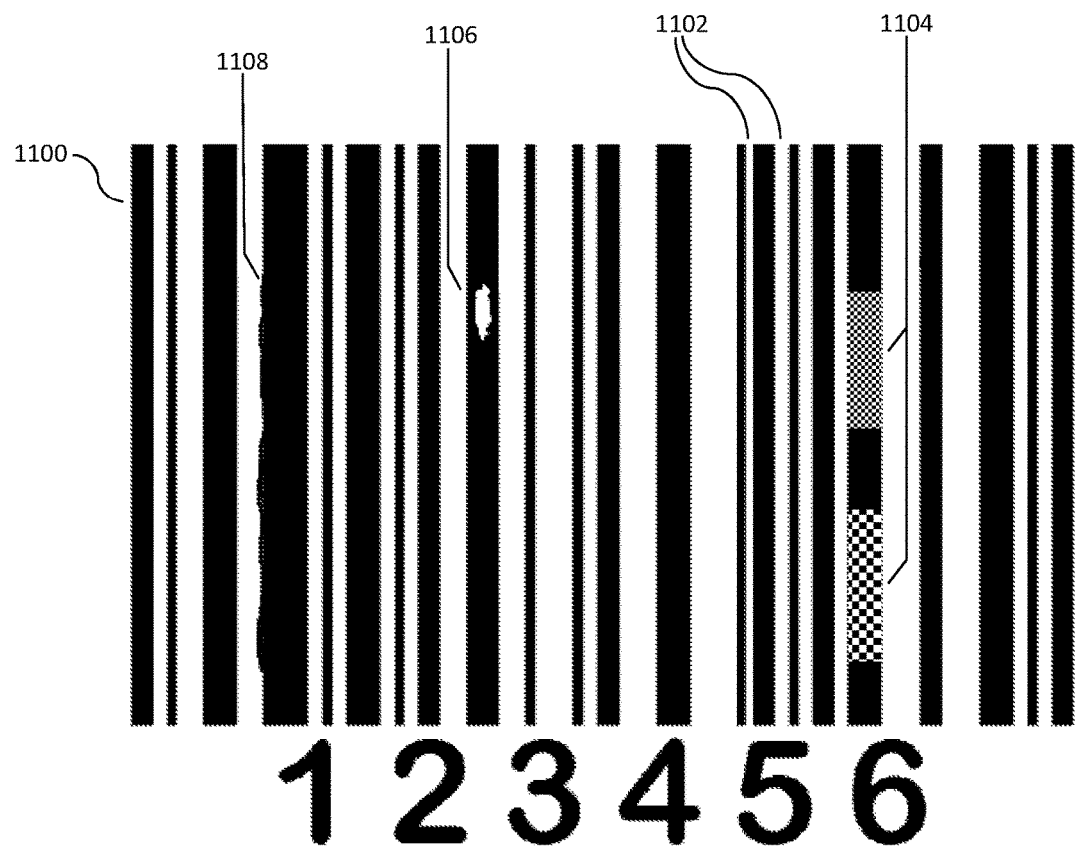
FIG. 11 is a one-dimensional barcode illustrating some features that may be used in an embodiment.

FIG. 11 depicts a 1D linear barcode 1100 having features whose characteristics may be measured to generate a set of metrics for use as part of signature data. These features include: variations in the width of and/or spacing between bars 1102; variations in the average color, pigmentation or intensity 1104; voids in black bars 1106 (or black spots in white stripes); or irregularities in the shape of the edges of the bars 1108.

Analysis by the Autocorrelation Method

In the embodiments described above, the raw list of data for each metric may first be array-index matched and subjected to normalized correlation to a like-order extracted metric set from a candidate symbol. These correlation results are then used to arrive at a match/no match decision (genuine vs. counterfeit). To do that, storage of the signature includes the sorting order of the original genuine symbol modules as well as the trained metrics values themselves, complete for each metric. In addition to the exhaustive storage need, the raw data is not "normalized," because each metric has its own scale, sometimes unbounded, which complicates the selection of storage bit-depths. A typical implementation of the above-described embodiments has a stored signature size of approximately 2 kilobytes.

Referring now to FIGS. 12 to 16, an alternative embodiment of metrics post-processing, storage and comparison methods is applied after the original artifact metrics have been extracted and made available as an index-array associated list (associable by module position in the symbol). Based on autocorrelation, the application of this new post-processing method can, in at least some circumstances, yield several significant benefits when compared to the signatures of the previous embodiments. Most significant is a reduction in data package size. For example, a 75% reduction in the stored signature data has been realized. Even more (up to 90% reduction) is possible with the application of some minor additional data compression methods. This dramatic reduction arises from the use of autocorrelation, list sorting, and the resultant normalization and data-modeling opportunities these mechanisms allow to be applied to the original artifacts' data.

Comparing Metrics of an Original Mark Signature and a Candidate Mark Signature

Various ways in which the metrics of a signature for an original mark and a signature of a candidate mark can be compared will now be described.

Where in the embodiments described above the analysis of a particular set of metrics data takes the form of comparing the sorted raw metrics extracted from a candidate symbol to the like-ordered raw metrics extracted from the genuine symbol, the autocorrelation method compares the autocorrelation series of the sorted candidate symbol metrics data to the autocorrelation series of the (stored) sorted genuine symbol data—effectively we now correlate the autocorrelations. In an embodiment, the Normalized Correlation Equation is used:

$$r_{xy} = \frac{n\Sigma x_i y_i - \Sigma x_i \Sigma y_i}{\sqrt{n\Sigma x_i^2 - (\Sigma x_i)^2} \sqrt{n\Sigma y_i^2 - (\Sigma y_i)^2}}$$

where r is the correlation result, n is the length of the metric data list, and x and y are the Genuine and Candidate metrics data sets. When the operation is implemented as an autocorrelation, both data sets x and y are the same.

To produce the autocorrelation series, the correlation is performed multiple times, each time offsetting the series x by one additional index position relative to the series y (remembering that y is a copy of x). As the offset progresses the data set must "wrap" back to the beginning as the last index in they data series is exceeded due to the x index offset; this is often accomplished most practically by doubling the y data and "sliding" the x data from offset 0 through offset n to generate the autocorrelation series.

In implementing the autocorrelation approach, the first benefit observed is that it is not necessary to store the signature data values themselves as part of the stored data. In autocorrelation, a data series is simply correlated against itself. So, where previously it was necessary to deliver both the extraction (sort) order and genuine signature data values to the verification device for validation, now only the sort/extraction order for the autocorrelation series operation need be provided.

The genuine autocorrelation signature needed to compare to the candidate symbol results does not require storing or passing the genuine data to the verifier. Because the operation of generating the signature is always performed on sorted metrics data, the autocorrelation series for the original artifacts' information is always a simple polynomial curve. Therefore, rather than needing to store the entire autocorrelation series of each genuine symbol metric, it is sufficient to store a set of polynomial coefficients that describe (to a predetermined order and precision) a best-fit curve matching the shape of the genuine autocorrelation results for each metric.

In an embodiment, $r_{xy}$ is computed, where each term $x_i$ is an artifact represented by its magnitude and location, and each term $y_i = x_{(i+j)}$, where j is the offset of the two datasets, for j=0 to (n−1). Because the $x_i$ are sorted by magnitude, and the magnitude is the most significant digits of $x_i$, there is a very strong correlation at or near j=0, falling off rapidly towards j=n/2. Because y is a copy of x, j and n−j are interchangeable. Therefore, the autocorrelation series always forms the U-shaped curve shown in FIG. 13, which is necessarily symmetric about j=0 and j=n/2. It is therefore only necessary to compute half of the curve, although in FIG. 13 the whole curve from j=0 to j=n is shown for clarity.

In practice, it has been found that a 6th order equation using 6 byte floating point values for the coefficients always matches the genuine data to within 1% curve fit error or "recognition fidelity." That is to say, if a candidate validation is done using the actual autocorrelation numbers and then the validation is done again on the same mark using the polynomial-modeled curve, the match scores obtained will be within 1% of each other. That is true both of the high match score for a genuine candidate mark and of the low match score for a counterfeit candidate mark. That allows a complete autocorrelation series to be represented with only 7 numbers. Assuming that 100 data points are obtained for each metric, and that there are 6 metrics (which have been found to be reasonable practical numbers), that yields a reduction of 600 data values to only 42, with no loss of symbol differentiability or analysis fidelity. Even if the individual numbers are larger, for example, if the 600 raw numbers are 4 byte integers and the 42 polynomial coefficients are 6 byte floating point numbers, there is a nearly 90% data reduction. In one experimental prototype, 600 single byte values became 42 4-byte floats, reducing 600 bytes to 168 bytes, a 72% reduction.

Further, the stored signature data is now explicitly bounded and normalized. The polynomial coefficients are expressed to a fixed precision, the autocorrelation data itself is by definition always between −1 and +1, and the sort order list is simply the module array index location within the analyzed symbol. For a 2D data matrix, the module array index is a raster-ordered index of module position within a symbol, ordered from the conventional origin datum for that symbology, and thus has a maximum size defined by the definition of the matrix symbology. In one common type of 2D data matrix, the origin is the point where two solid bars bounding the left and bottom sides of the grid meet. There is also established a standard sorted list length of 100 data points for each metric, giving a predictable, stable, and compact signature.

In an embodiment, the comparison of a genuine signature to a candidate now begins with "reconstituting" the genuine symbol autocorrelation signature by using the stored polynomial coefficients. Then, the raw metrics data is extracted from the candidate symbol, and is sorted in the same sort order, which may be indicated as part of the genuine signature data if it is not predetermined.

The candidate metrics data is then autocorrelated. The resultant autocorrelation series may then be correlated against the reconstituted genuine autocorrelation curve for that metric, or alternatively the two curves may be compared by computing a curve-fit error between the pair. This correlation is illustrated graphically in FIGS. 13 and 16. This final correlation score then becomes the individual "match" score for that particular metric. Once completed for all metrics, the "match" scores are used to make the genuine/counterfeit decision for the candidate symbol.

Additionally, use can further be made of the autocorrelation curves by applying power-series analysis to the data via discrete Fourier transform ("DFT"):

$$X_k = \sum_{n=0}^{N-1} x_n \cdot e^{-i2\pi kn/N}$$

where $X_k$ is the $k^{th}$ frequency component, N is the length of the metric data list, and x is the metrics data set.

The Power Series of the DFT data is then calculated. Each frequency component, represented by a complex number in the DFT series, is then analyzed for magnitude, with the phase component discarded. The resulting data describes the distribution of the metric data spectral energy, from low to high frequency, and it becomes the basis for further analysis. Examples of these power series are shown graphically in FIGS. 14, 15, and 17.

Two frequency-domain analytics are employed: Kurtosis and a measure of energy distribution around the center band frequency of the total spectrum, referred to as Distribution Bias. Kurtosis is a common statistical operation used for measuring the "peakedness" of a distribution, useful here for signaling the presence of tightly grouped frequencies with limited band spread in the power series data. In an embodiment, a modified Kurtosis function may be employed as follows:

$$\text{kurtosis} = \frac{\sum_{N=1}^{N}(Y_n - \overline{Y})^4}{N(N-1)s^4}$$

where $\overline{Y}$ is the mean of the power series magnitude data, s is the standard deviation of the magnitudes, and N is the number of analyzed discrete spectral frequencies.

The Distribution Bias is calculated as $$DB = \frac{\sum_{n=0}^{(N/2)-1} x_n - \sum_{n=N/2}^{N} x_n}{\sum_{n=0}^{N} x_n}$$

where N is the number of analyzed discrete spectral frequencies.

The smooth polynomial curve of the genuine symbol metric signatures (arising from the by-magnitude sorting) yields recognizable characteristics in the spectral signature when analyzed in the frequency domain. A candidate mark, when the metrics data are extracted in the same order as prescribed by the genuine signature data, will present a similar spectral energy distribution if the mark is genuine. In other words, the genuine sort order "agrees" with the candidate's metric magnitudes. Disagreement in the sorted magnitudes, or other superimposed signals (such as photo-copying artifacts), tend show up as high-frequency components that are otherwise absent in the genuine symbol spectra, thus providing an additional measure of symbol authenticity. This addresses the possibility that a counterfeit autocorrelation series might still satisfy the minimum statistical match threshold of the genuine mark. This is a remote possibility, but can conceivably happen when using normalized correlation if the overall range of the data is large compared to the magnitude of the errors between individual data points and the natural sort order of the dominant metric magnitudes happens to be close to that of the genuine symbol. The distribution characteristics of the DFT power series of such a signal will reveal the poor quality of the match via the high frequencies present in the small amplitude match errors of the candidate series. Such a condition could be indicative of a photocopy of a genuine symbol. In specific terms, here we expect a high Kurtosis and a high Distribution Ratio in the spectra of a genuine symbol.

Along with the autocorrelation match score, one can make use of this power series distribution information as a measure of "confidence" in the verification of a candidate symbol.

Figure 12:
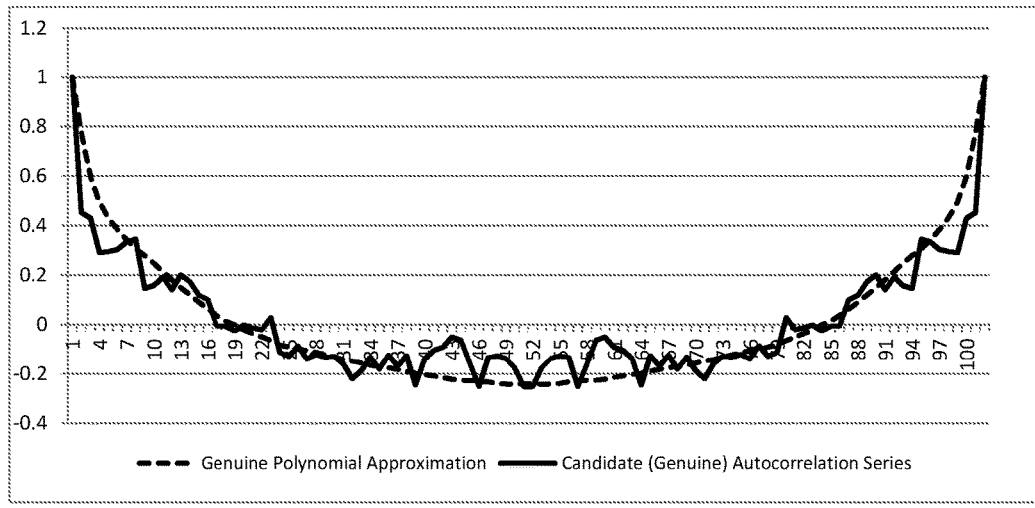
FIG. 12 is a graph of a polynomial approximation of an autocorrelation series for an original mark with a candidate mark (which evaluates as genuine), according to an embodiment.

FIG. 12 shows a comparison of the autocorrelation series for a single metric between a genuine item (polynomial approximation) and a candidate symbol (genuine in this case). Here the correlation between the 2 autocorrelation series exceeds 93%.

Figure 13:
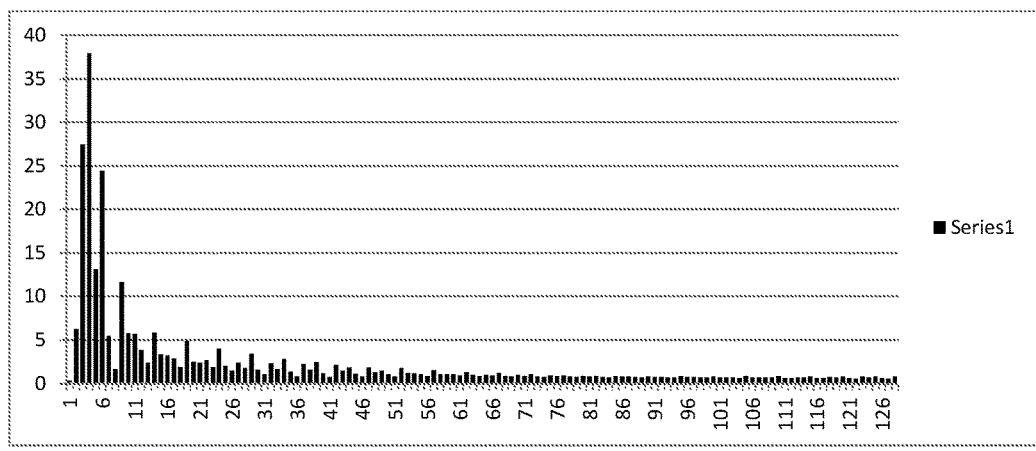
FIG. 13 is a chart of a power series for the original mark data of FIG. 12.

FIG. 13 is a power series from the original genuine autocorrelation data used for FIG. 12. It can clearly be seen that the spectrum is dominated by low frequencies.

Figure 14:
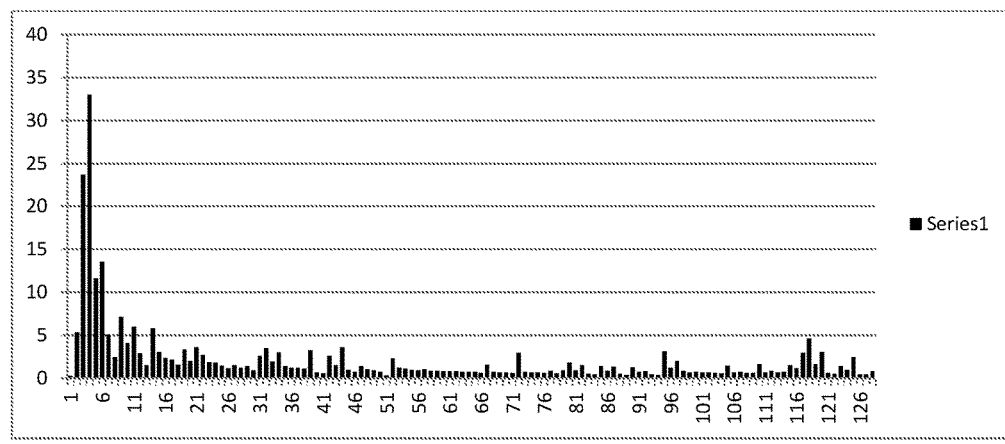
FIG. 14 is a chart of a power series for the candidate mark data of FIG. 12.

FIG. 14 is a power series similar to FIG. 13 from a cell phone acquired image of a genuine mark. Some image noise is present, but the overall power spectrum closely matches the genuine spectrum, with the same dominance of low frequency components.

Figure 15:
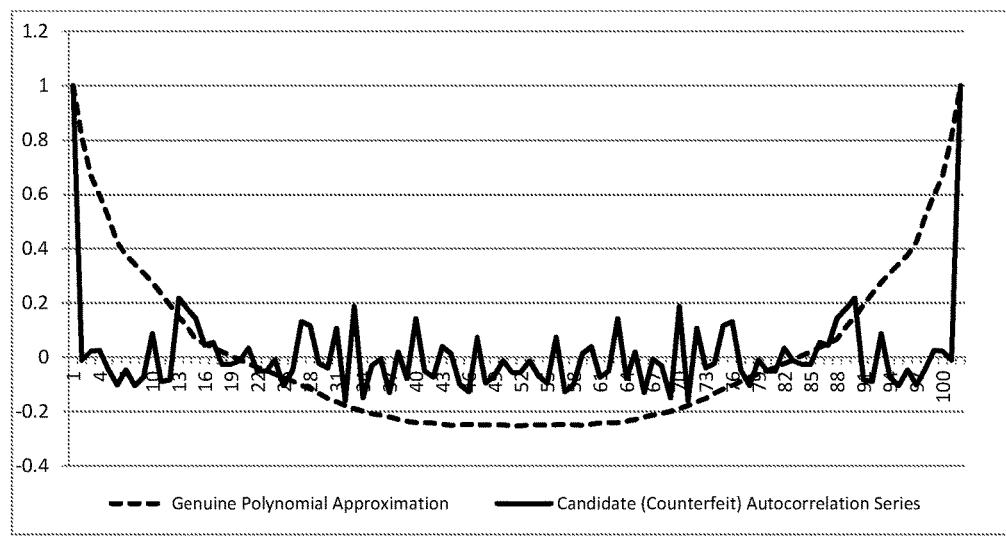
FIG. 15 is a graph of a polynomial approximation of an autocorrelation series for an original mark with a candidate mark (which evaluates as counterfeit), according to an embodiment.

FIG. 15 shows a comparison of the autocorrelation series for a single metric between the polynomial approximation for a genuine (original) mark and a candidate mark (here, a counterfeit). There is considerable disagreement, and the candidate autocorrelation is noticeably more jagged than in FIG. 12. The numeric correlation between the two series is low (<5%), and the jagged shape of the data is also apparent in the DFT analysis.

Figure 16:
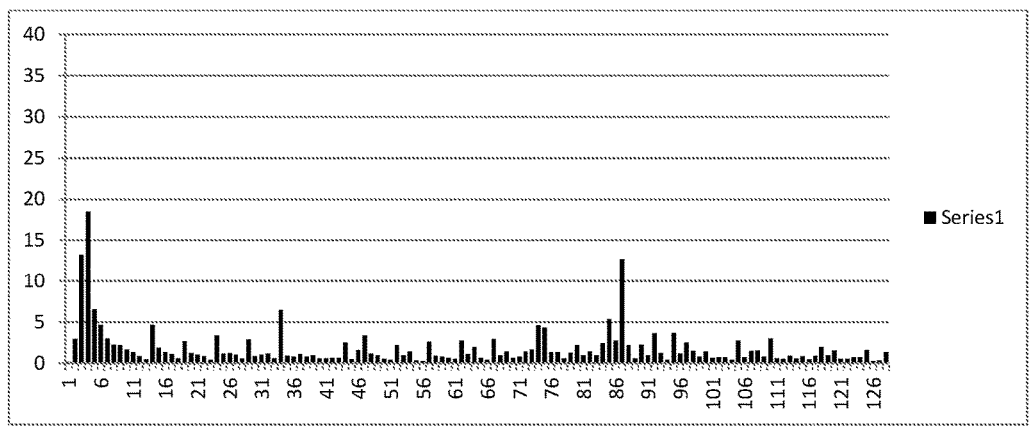
FIG. 16 is a chart of a power series for the candidate mark data of FIG. 15.

FIG. 16 shows the power series from the cell phone acquired image of the counterfeit symbol of the plot of FIG. 15. Note how the low frequency components are diminished with the total spectral energy now spread out to include significant portions of the higher frequency range.

Excluding Metrics that Indicate Damage

In various embodiments, a processor or computer system (such as one or more of those shown in FIGS. 7 and 8) identifies metrics that likely represent damaged portions of a mark and excludes such metrics prior to determining whether the mark is genuine. Turning to FIG. 17, a mark that will be used to help illustrate such a process is shown. The exemplary mark of FIG. 17 is a 2D bar code that includes several features. The mark has a left-edge finder bar and a bottom-edge finder bar. Those are the solid, black bars along the left and bottom edges used by detection equipment to establish spatial parameters needed to read information encoded by the mark. The exemplary mark encodes useful information in the pattern of black and white marks representing bits, binary digits, bounded by the finder bars. The useful information may include redundant information for correcting errors introduced by mechanical damage after the mark has been created. Such redundant information may include additional bits determined using any suitable error-correcting code, such as a Reed-Solomon code, a Hamming code, or other. Use of error-correcting codes allows any bit which has been damaged to the degree that it is misread to be corrected, and therefore to be identified either directly or by comparing an uncorrected version of decoded information and a corrected version of decoded information. The mark also includes variations such as pinhole spots in the black regions, wiggles in the edges of the black regions, and the like that include artifacts of the normal operation of the marking equipment that occur in different marks made by the marking equipment both randomly and repetitively.

Figure 18:
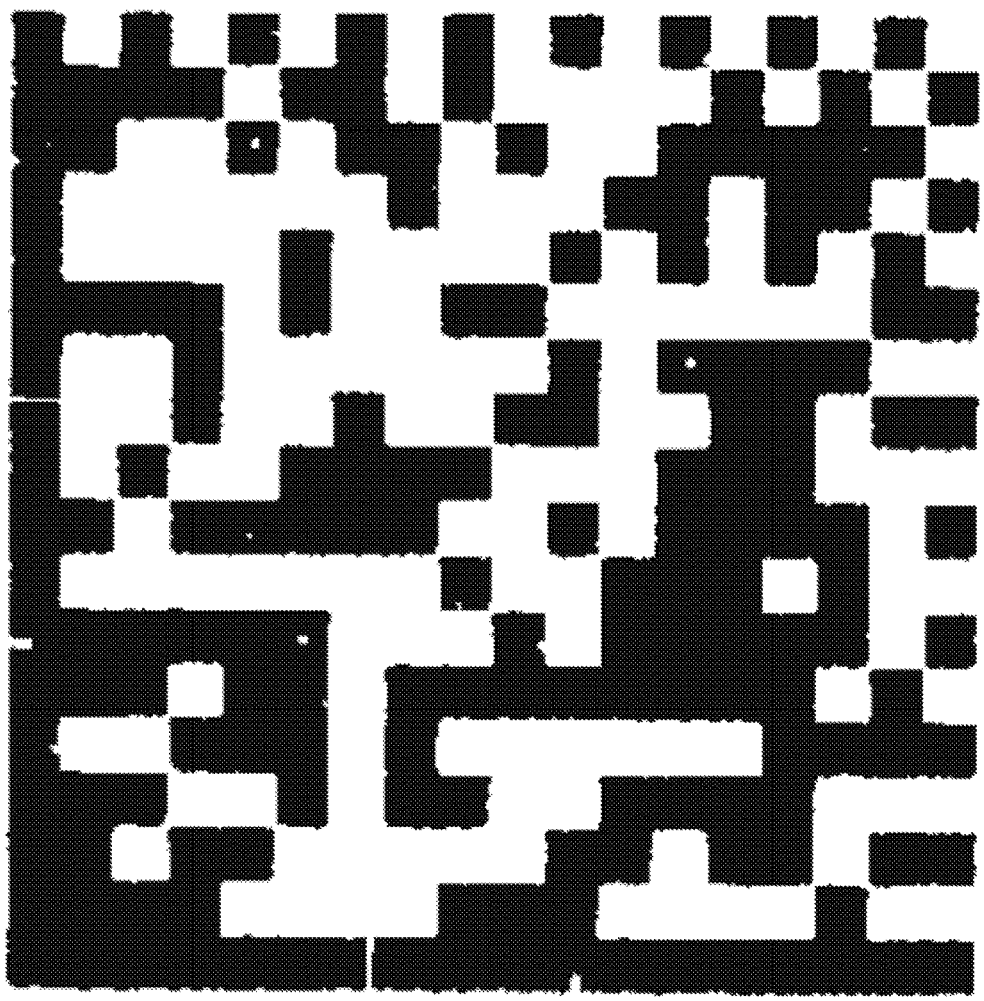
FIG. 18 is a first example of the mark of FIG. 17 after it has been damaged.

FIG. 18 and FIG. 19 show the result of different types of damage such as dings and scrapes that alter the black areas of the mark of FIG. 18. As will be explained further in connection with FIGS. 21-25, a signature signal recovered from the mark of FIG. 18 differs from those recovered from the marks of FIGS. 19 and 20 by the effect of the damage present.

In an instance where damage to a candidate mark makes it only partially readable, or makes it impossible to read and/or decode a data-carrying symbol, or the like, undamaged identifying features of only a portion of the mark may be sufficient to identify the mark. Once the candidate mark is thus matched with an original mark, the signature of the original mark can be retrieved from storage, and any information that was incorporated into the signature, such as a serial number of the marked item, may be recovered from the retrieved signature instead of directly from the damaged mark. Thus, the signature data, either in combination with partially recovered encoded symbol information or not, can be used to uniquely identify an item to which the candidate mark has been applied.

In an embodiment, a processor or computer system (such as one or more of those shown in FIGS. 8 and 9) carries out the following procedure: (1) run a statistical correlation process on the candidate signature versus the original signature, (2) if, based on the correlation process, the processor or computer system determines that the candidate signature is not from a genuine mark, then (3) identify the damage signal superposed on the candidate signature signal, (4) remove the damage signal, (5) evaluate the candidate signature on the basis of the remaining signature signal (i.e., the portion of the signature remaining after removal of the damage signal) by running a statistical correlation process on the candidate signature versus the original signature, (6) if the correlation improves sufficiently, then conclude that there is a match between the original signature and the candidate signature, (7) If the correlation does not improve sufficiently, then conclude that there is no match between the original signature and the candidate signature.

Figure 21:
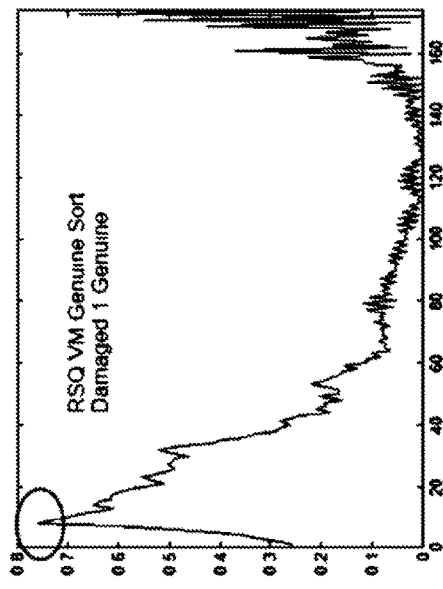
FIG. 21 is a plot of the correlation of values of a series of metrics representing the signature of the candidate mark of FIG. 18 against the stored series of metrics representing the signature for the genuine mark, indicative of a no match (a false negative, in this instance).
Figure 23:
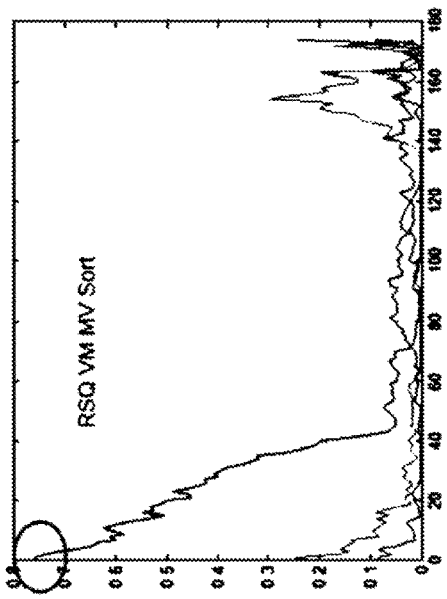
FIG. 23 is a plot of the correlation of values of a series of metrics representing the signature of the candidate mark of FIG. 18 (after elimination of metrics indicating damage) against the stored series of metrics representing the signature for the genuine mark (after elimination of metrics corresponding to the metrics of the candidate signature that were eliminated), indicative of a match.
Figure 22:
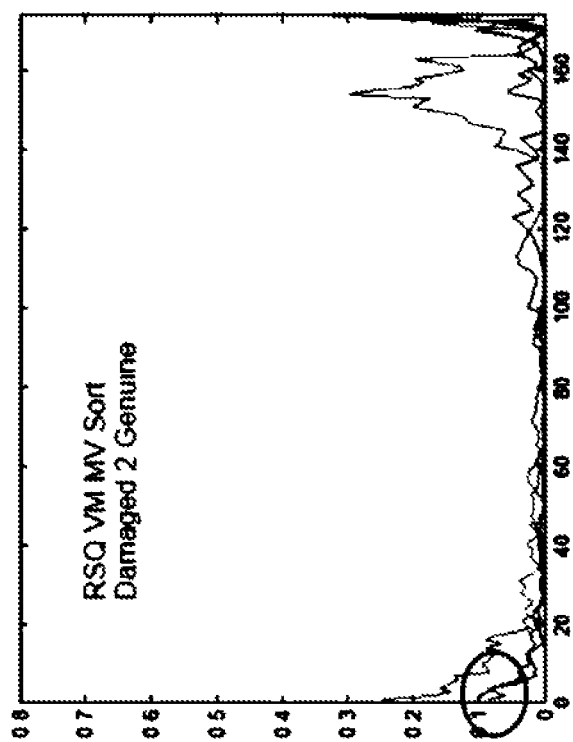
FIG. 22 is a plot of the correlation of values of a series of metrics representing the signature of the candidate mark of FIG. 19 against the stored series of metrics representing the signature for the genuine mark, indicative of a no match (a false negative, in this instance).

To illustrate how much removing the damage signal from a signature of a candidate mark can improve the likelihood of accurate recognition, reference is made to FIGS. 20-22, which show the performance of correlation techniques on the marks of FIGS. 17-19 without removing the damage signal. Compare this to FIGS. 23-25, which show performance of techniques described herein with respect to removing the damage signal. As seen, if there is no damage on the mark (FIG. 17), then the results of the two procedures are not significantly different (FIGS. 20 and 23). However, for damaged marks, (FIGS. 18 and 19), removing the damage signal makes a considerable difference (FIG. 21 vs. FIG. 24 and FIG. 22 vs. FIG. 25).

Turning to FIG. 26, a process carried out by a processor (e.g., of the computer system 700 or 804) to capture and verify the signature data for a candidate mark according to an embodiment is described. At step 2602, the processor receives a captured image of a candidate mark from an image acquisition device. At step 2604, the processor uses the image to measure one or more characteristics at multiple locations on the candidate mark, resulting in a first set of metrics, such as that shown in FIG. 27. At step 2606, the processor retrieves, from a computer-readable memory, a second set of metrics that represents one or more characteristics measured at a plurality of locations on the original mark. At step 2608, the processor removes, from the first set of metrics, a metric that indicates damage to the mark, resulting in a trimmed first set of metrics. There are various ways in which the processor can identify a metric indicating damage to the candidate mark. For example, the processor can identify a metric having a dominant amplitude. In one embodiment, the processor deems metrics that exceed a predetermined threshold to have a dominant amplitude. If the candidate mark includes error-correcting redundancy codes, the processor may decode the error-correcting redundancy codes to identify one or more damaged regions in the mark. At step 2610, the processor removes, from the second set of metrics, a metric corresponding to the metric removed from the first set of metrics, resulting in a trimmed second set of metrics.

For example, assume that in the set of metrics of FIG. 27, each of the first column of numbers represents an index value (e.g., raster index) and each of the second column represents metric value obtained from measuring a characteristic of the mark (e.g., at a location on the mark associated with the index value). Further assume that the "damage noise" threshold is 185. In other words, the processor will deem any metric value exceeding 185 as indicating damage to the candidate mark. In this example, the processor would remove the metric associated with the index number 169 from both the first set of metrics and from the second set of metrics.

At step 2612, the processor compares the trimmed first set of metrics with the trimmed second set of metrics. At step 2614, the processor determines whether the candidate mark can be verified as genuine based on the comparison.

If, at step 2614, based on the comparison, the processor verifies that the candidate mark is genuine, then the processor alerts the user of this fact at step 2616. If, on the other hand, the processor is not able to verify that the mark is genuine, and the retry limit has not been reached (step 2618), then the processor prompts the user to re-submit another image of the candidate mark for processing, and the process returns to step 2608. If, however, the retry limit has been reached—e.g., a predetermined limit on the number of metrics that are to be removed from the candidate metric data set—then the process ends. In an embodiment, the predetermined limit is at or about 30% of the metric data set. For example, in a second iteration, with the trimmed first set of metrics of the candidate mark, the processor would, at step 2608, remove the metric associated with the index number 165 (the metric associated with index number 169 having already been removed), creating a trimmed third set of metrics, and remove the corresponding metric from the trimmed second set, create a trimmed fourth set of metrics. The processor would then compare the third and fourth sets of metrics, etc.

Turning to FIG. 28, a process carried out by a processor (e.g., of the computer system 700 or 804) to capture and verify the signature data for a candidate mark according to another embodiment is described. At step 2802, the processor receives an image of a candidate mark from an image acquisition device. At step 2804, the processor uses the image to measure one or more characteristics at multiple locations on the candidate mark, resulting in a first set of metrics. At step 2806, the processor retrieves, from a computer-readable memory, a second set of metrics that represents one or more characteristics measured at a plurality of locations on the original mark. At step 2808, the processor compares the first set of metrics with the second set of metrics. At step 2810, the processor determines whether the candidate mark can be verified to be genuine based on the comparison of the first set of metrics with the second set of metrics. If, at step 2810, based on the comparison between the first set of metrics and the second set of metrics, the processor determines that the mark can be verified to be genuine, then the process moves to step 2812, at which the processor notifies the user that the mark is genuine. If, at step 2810, the processor determines that the candidate mark cannot be verified to be genuine, then the processor carries out steps 2814, 2816, and 2818, which are identical to steps 2608, 2610, and 2612 of FIG. 26. The processor may also carry out steps similar to steps 2614 and 2618 (omitted from FIG. 28 for the sake of clarity), creating a trimmed third set of metrics and a trimmed fourth set of metrics.

Turning to FIG. 29, a process carried out by a processor (e.g., of the computer system 700 or 804) to capture and verify the signature data for a candidate mark according to another embodiment is described. At step 2902, the processor receives an image of a candidate mark from an image acquisition device. At step 2904, the processor uses the image to measure one or more characteristics at multiple locations on the candidate mark, resulting in an overall set of metrics. At step 2906, the processor subdivides the overall set of metrics into multiple sets of metrics, including a first set of metrics. At step 2908, the processor retrieves, from a computer-readable memory, a second set of metrics that represents one or more characteristics measured at a plurality of locations on the original mark. At step 2910, the processor removes, from the first set of metrics, a metric having a dominant amplitude, resulting in a trimmed first set of metrics. At step 2912, the processor removes, from the second set of metrics, a metric corresponding to the metric removed from the first set of metrics, resulting in a trimmed second set of metrics. At step 2914, the processor compares the trimmed first set of metrics with the trimmed second set of metrics. At step 2916, the processor determines whether the mark can be verified to be genuine based on the comparison.

In another embodiment, the processor divides the candidate metric set into subsets by region of the mark and, in removing metrics suspected to be the result of damage to the candidate mark, excludes at least one subset having poor correlation with the equivalent data set of the original mark. The processor may further repeat the dividing and removing processes, and determine that the candidate mark is likely made by the marking device that made the genuine mark when the correlation of remaining subdivisions reaches a threshold after excluding at least one subset having poor correlation.

According to an embodiment, a processor-implemented process for identifying a genuine marking whose image has been captured and reduced to a verification metric data set indexed by amplitude for the genuine marking, by analyzing a verification metric data set indexed by amplitude for a candidate marking that has been damaged reduced from a captured image of the candidate marking that is one of the genuine marking and a counterfeit marking, based on variations in the genuine marking and the candidate marking includes: removing from the verification metric set for the candidate marking a verification metric having a dominant amplitude and removing from the verification metric set for the genuine marking a verification metric corresponding to the verification metric having a dominant amplitude in the verification metric set for the candidate marking to produce a trimmed verification metric set for the genuine marking and a trimmed verification metric set for the candidate marking; comparing the trimmed verification metric sets; and identifying based on the comparing whether the candidate marking is likely made by the marking device that made the genuine mark.

In a variation, the processor-implemented method further includes making an initial determination prior to the step of removing that the candidate marking is not likely made by the marking device that made the genuine mark. In another variation, the processor-implemented method is performed on an encoded mark that includes error-correcting redundancy, and further includes: decoding the error-correcting redundancy in the mark to identify a damaged region in the mark, and removing further includes excluding verification metrics originating from the damaged region. In yet another variation, the processor-implemented method further includes dividing the verification metric sets into subsets by region of the mark, wherein removing further includes excluding at least one subset having poor correlation. This variation may further include repeating the dividing and removing steps and determining the candidate mark is likely made by the marking device that made the genuine mark when the correlation of remaining subdivisions reaches a threshold after excluding at least one subset having poor correlation.

According to an embodiment, when a mark is damaged, a damage signal is superposed on the signature signal, and overwhelms the signature signal. The portion of the image of the mark analyzed may be, for example, the linearity (or deviation from linearity) of a known, straight edge within the mark, such as one of the finder bars in two-dimensional bar codes in FIGS. 17-19. Thus, when a mark has been provisionally identified as not originating from the genuine source, further steps are taken, as follows. First, identify the larger, damage signal superposed on the overall signature signal and then remove it. Next, evaluate the signature on the basis of the remaining signature signal. If the damage signal is removed from the signature signal, and correlation improves sufficiently, then a match between the original signature and the candidate signature is reported by the method. If the damage signal is removed and correlation fails to improve sufficiently or falls, then the method confirms no match between the original signature and the candidate signature.

Where an original mark is applied to an original item, and/or an original item is appended to an original object, the mark or item may contain information about the item or object. In that case, the above-described methods and systems may include verifying information about the item or object that is included in the mark or item, even when the underlying item or object is not physically replaced or altered. For example, where an object is marked with an expiry date, it may be desirable to reject an object with an altered expiry date as "not authentic" even if the object itself is the original object. Embodiments of the present systems and methods will produce that result, if the artifacts used for verification are found in the expiry date, for example, as imperfections of printing. Other information such as lot numbers and other product tracking data may similarly be verified.

Various embodiments have been described in terms of acquiring an entire 2D barcode for signature data. However, the mark may be divided into smaller zones. Where the original mark is large enough, and has enough artifacts that are potential signature data, only one, or fewer than all, zones may be acquired and processed. Where more than one zone is acquired and processed, the signature data from different zones may be recorded separately. That is especially useful if the mark is a symbol encoding data with error correction, and the error correction relates to zones smaller than the entire symbol. Then, if the error correction indicates that part of the candidate symbol is damaged, the signature data from the damaged part can be disregarded.

Although the embodiments have been described primarily in terms of distinguishing an original mark (and by implication an original item to which that mark is applied or attached) from a counterfeit copy of the mark, the present methods, apparatus, and products may be used for other purposes, including distinguishing between different instances of the original mark (and item).

In the interests of simplicity, specific embodiments have been described in which the artifacts are defects in printing of a printed mark, applied either directly to the item that is to be verified, or to a label applied to an object that is to be verified. However, as has already been mentioned, any feature that is sufficiently detectable and permanent, and sufficiently difficult to duplicate, may be used.

Some of the embodiments have been described as using a database of signature data for genuine items, within which a search is conducted for a signature data that at least partially matches the signature data extracted from a candidate mark. However, if the candidate item is identified as a specific genuine item in some other way, a search may be unnecessary, and the signature data extracted from the candidate mark may be compared directly with the stored signature data for the specific genuine item.

Referring to FIG. 30, another computer hardware environment in which the various methods disclosed here can be practiced is described. The exemplary computer hardware environment can be generally described as a computer network of any suitable size and scope that supports and includes the operational elements and architecture relied on by the exemplary methods and apparatus described below. Some common operational elements and architectural features are now described in connection with FIG. 30.

Various computing devices are interconnected for communication through a computer network having any suitable hardware configuration, such as the global Internet computer network, 3000. The computing devices can include one or more of any of the following devices: mobile devices, 3001; portable and fixed computing devices, 3002; servers, 3003, of content, software, Software as a Service (SaaS), storage, and other resources; communication resources, 3004, such as interconnects, switches, and routers; and other computing resources, 3005. Mobile devices, portable and fixed computing devices, switches, routers, and servers generally include a central processing unit ("CPU"), microprocessor, micro-controller, or similar element that executes software instructions to accomplish the tasks for which they are employed. Local instructions and local data are stored in suitable forms of computer storage and computer memory, including both transitory and non-transitory media and/or signals. Devices may include input peripherals, display peripherals, and other peripherals that are either integrated into the device or connected to the device.

Mobile devices, 3001, may include devices that integrate wireless, mobile phone services with Internet-connected, mobile data services. Examples of such devices include smartphones made by various manufacturers, which operate using a variety of operating systems, on a variety of carriers. Mobile devices may also include tablets and other devices intended to operate from a wide range and variety of locations using cellular radio communications links, Wi-Fi radio communications links, and other suitable communications links. Mobile devices may be integrated into wearable form, eyeglass frames, and the like, vehicles, etc.

The methods described above can be performed using any of the processor-implemented devices described. Different parts of the method may be performed using different processors. For example, scanning and learning the signature of genuine marks may be performed by stationary computers located at the site where marking is performed. In the same example, verification can be performed by mobile devices located at a site where marked articles are consumed, transported, purchased, sold, etc.

Any of the devices, computers, servers, etc. described above may be a general-purpose computer system 3100 such as that shown in FIG. 31. The computer system 3100 may include a processor 3103 connected to one or more memory devices 3104, such as a disk drive, memory, or other device for storing data. Memory 3104 is typically used for storing programs and data during operation of the computer system 3100. Components of computer system 3100 may be coupled by an interconnection mechanism 3104, which may include one or more busses (e.g., between components that are integrated within a same machine) and/or a network (e.g., between components that reside on separate discrete machines). The interconnection mechanism 3105 enables communications (e.g., data, instructions) to be exchanged between system components of system 3100.

Computer system 3100 also includes one or more input devices 3102, for example, a keyboard, mouse, trackball, microphone, touch screen, and one or more output devices 3101, for example, a printing device, display screen, speaker. In addition, computer system 3100 may contain one or more interfaces (not shown) that connect computer system 3100 to a communication network (in addition or as an alternative to the interconnection mechanism 3105. Depending on the particular use to which the system 3100 is to be put, one or more of the components described can optionally be omitted, or one or more of the components described can be highly specialized to accomplish the particular use. For example, a storage system may not have separate input devices and output devices; those may be combined in a communication system employing a high-speed bus or network to move data and instructions between the storage system and a data consumer.

The storage system 3106, shown in greater detail in FIG. 32, typically includes a computer readable and writeable nonvolatile recording medium 3201 in which signals are stored that define instructions that taken together form a program to be executed by the processor or information stored on or in the medium 3201 to be processed by the program. The medium may, for example, be a disk or flash memory. Optionally, the medium may be read-only, thus storing only instructions and static data for performing a specialized task. Typically, in operation, the processor causes data to be read from the nonvolatile recording medium 3201 into another memory 3202 that allows for faster access to the information by the processor than does the medium 3201. This memory 3202 is typically a volatile, random access memory such as a dynamic random access memory ("DRAM") or static memory ("SRAM"). It may be located in storage system 3106, as shown, or in memory system 3104, not shown. The processor 3103 generally manipulates the data within the integrated circuit memory 3104, 3202 and then copies the data to the medium 3101 after processing is completed. A variety of mechanisms are known for managing data movement between the medium 3201 and the integrated circuit memory element 3104, 3202, and the disclosure is not limited thereto. The disclosure is not limited to a particular memory system 3104 or storage system 3106.

The computer system may include specially-programmed, special-purpose hardware, for example, an application-specific integrated circuit ("ASIC"). Aspects of the disclosure may be implemented in software, hardware or firmware, or any combination thereof. Further, such methods, acts, systems, system elements and components thereof may be implemented as part of the computer system described above or as an independent component.

Although computer system 3100 is shown by way of example as one type of computer system upon which various aspects of the disclosure may be practiced, it should be appreciated that aspects of the disclosure are not limited to being implemented on the computer system as shown in FIG. 31. Various aspects of the disclosure may be practiced on one or more computers having a different architecture or components that that shown in FIG. 31.

Computer system 3100 may be a general-purpose computer system that is programmable using a high-level computer programming language. Computer system 3100 may be also implemented using specially programmed, special purpose hardware. In computer system 3100, processor 3103 may be any suitable processor for the task at hand. An executive or operating system on which a work program is layered may control the processor. Any suitable executive or operating system may be used.

The processor and operating system together define a computer platform for which application programs in high-level programming languages are written. It should be understood that the disclosure is not limited to a particular computer system platform, processor, operating system, or network. Also, it should be apparent to those skilled in the art that the disclosure is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP).

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the disclosure may be implemented in a non-programmed environment (e.g., documents created in HTML, XML or other format that, when viewed in a window of a browser program, render aspects of a graphical-user interface ("GUI") or perform other functions). Various aspects of the disclosure may be implemented as programmed or non-programmed elements, or any combination thereof.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. A method for encoding, storing, and retrieving an electronic signature of a barcode, the method comprising:
    a first computer system optically capturing an image of an original barcode;
    the first computer system
        extracting one or more optical or physical characteristics of the original barcode at a plurality of locations on the original barcode;
        encoding the one or more optical or physical characteristics of the original barcode into a verification metric data set for the original barcode;
    the first computer system storing the verification metric data set of the original barcode in a database on a network storage;
    a second computer system retrieving the verification metric data set of the original barcode from the database;
    the second computer system optically capturing an image of a candidate barcode;
    the second computer system
        extracting one or more optical or physical characteristics of the candidate barcode at a plurality of locations on the candidate barcode,
        wherein optical or physical characteristics extracted from the candidate barcode by the second computer system are taken from the same locations from which the first computer system extracted optical or physical characteristics from the original barcode;
        trimming the optical or physical characteristics extracted from the candidate barcode by removing one or more dominant optical or physical characteristics;
        encoding the trimmed optical or physical characteristics of the candidate barcode into a verification metric data set for the candidate barcode;
    the second computer system retrieving the verification metric data set of the original barcode from the network storage;
    the second computer system trimming the optical or physical characteristics extracted from the original barcode by removing the same optical or physical characteristics from the verification metric data set of the original barcode as were removed from the verification metric data set of the candidate barcode;
    the second computer system verifying the candidate bar code based on a comparison between the verification metric data set of the original barcode and the verification metric data set of the candidate barcode;
    the second computer system transmitting a message indicating a result of the verifying step.

2. The method of claim 1, wherein the second computer system trimming the optical or physical characteristics extracted from the candidate barcode by removing one or more dominant optical or physical characteristics extracted from the candidate barcode comprises the second computer system removing the highest-magnitude optical or physical characteristics extracted from the candidate barcode.

3. The method of claim 1, wherein the second computer system trimming the optical or physical characteristics extracted from the candidate barcode by removing one or more dominant optical or physical characteristics extracted from the candidate barcode comprises removing each of the optical or physical characteristics that exceed a predetermined threshold.

4. The method of claim 1, further comprising:
    the second computer system decoding an error correction code of the candidate barcode to determine locations of the plurality of locations that are damaged; and
    the second computer system excluding, based on the decoded error correction code, optical or physical characteristics that were extracted from locations of the plurality of locations on the candidate barcode that are determined to be damaged.

5. A method for establishing a signature for a printed mark, the method comprising:
    printing a mark, wherein the printed mark includes imperfections resulting from a printing process that printed the mark;
    capturing an image of the printed mark;
    forming a genuine mark signature based on the imperfections by carrying out steps comprising
        extracting one or more optical or physical characteristics of the printed mark at a plurality of locations on the printed mark;
        trimming the optical or physical characteristics by removing one or more dominant optical or physical characteristics;
        encoding the trimmed optical or physical characteristics of the printed mark into a verification metric data set;
    storing the genuine mark signature in a database; and
    applying the printed mark to an item.

6. The method of claim 5, wherein the printed mark includes coded information regarding the item to which the mark is applied.

7. The method of claim 6, wherein
    the coded information comprises an item identifier, and
    storing the genuine mark signature comprises using the item identifier index the genuine mark signature for subsequent retrieval from the database.

8. The method of claim 5, wherein the printed mark is a logo.

9. The method of claim 5, wherein the optical or physical characteristics comprise irregularities along an edge of a feature of a barcode.

10. The method of claim 9, wherein
the irregularities are among the imperfections on which the genuine mark signature is based, and
forming the genuine mark signature comprises giving the irregularities greater weight than the rest of the imperfections.

11. The method of claim 5, further comprising storing, along with the genuine mark signature, metadata regarding a device involved in a process used to print the mark.

12. The method of claim 5, further comprising storing, along with the genuine mark signature, information regarding a device used to capture the image of the printed mark.

13. A computer system comprising a processor that carries out actions comprising:
receiving an image of a candidate mark from an image acquisition device;
using the image to measure one or more characteristics at a plurality of locations on the candidate mark, resulting in a first set of metrics;
removing a highest metric from the first set of metrics, resulting in a trimmed first set of metrics;
retrieving, from a computer-readable memory, a second set of metrics that represents one or more characteristics measured at a plurality of locations on an original mark;
removing, from the second set of metrics, a metric corresponding to the metric removed from the first set of metrics, resulting in a trimmed second set of metrics;
comparing the trimmed first set of metrics with the trimmed second set of metrics;
determining whether the candidate mark can be verified as genuine based on the comparison;
if, based on the comparison, it is determined that the mark cannot be verified to be genuine, carrying out further actions comprising:
removing a next highest metric from the trimmed first set of metrics, resulting in a further trimmed first set of metrics;
removing, from the trimmed second set of metrics, a metric corresponding to the metric removed from the trimmed first set of metrics, resulting in a further trimmed second set of metrics;
comparing the further trimmed first set of metrics with the further trimmed second set of metrics;
determining whether the mark can be verified to be genuine based on the comparison of the further trimmed first set of metrics and the further trimmed second set of metrics; and
repeating the removing, comparing, and determining steps for successively further trimmed sets of metrics until the metrics remaining in the trimmed first set of metrics for the candidate mark is less than a predetermined threshold amount.

14. The computer system of claim 13, wherein the processor carries out further actions comprising:
if, after the metrics remaining in the trimmed first set of metrics for the candidate mark are less than the predetermined threshold amount, it is determined that the mark cannot be verified to be genuine, prompting a user to re-submit another image of the mark.

15. The computer system of claim 14, wherein the processor carries out further actions comprising:
determining whether a predetermined retry limit has been reached.

* * * * *